(12) United States Patent
Sugimoto

(10) Patent No.: US 8,764,595 B1
(45) Date of Patent: Jul. 1, 2014

(54) VEHICLE POWER TRANSMISSION APPARATUS

(71) Applicant: Toyota Jidosha Kabushiki Kaisha, Toyota (JP)

(72) Inventor: Takayuki Sugimoto, Nisshin (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 13/991,649

(22) PCT Filed: Dec. 12, 2012

(86) PCT No.: PCT/JP2012/082249
§ 371 (c)(1), (2), (4) Date: Jun. 5, 2013

(51) Int. Cl.
*F16H 3/72* (2006.01)

(52) U.S. Cl.
USPC ............................................................ 475/5

(58) Field of Classification Search
None
See application file for complete search history.

(56) References Cited

U.S. PATENT DOCUMENTS

| | | | |
|---|---|---|---|
| 7,895,912 | B2 | 3/2011 | Arai |
| 7,959,534 | B2 | 6/2011 | Kasuga et al. |
| 2011/0105265 | A1 | 5/2011 | Yoshimura |

FOREIGN PATENT DOCUMENTS

| | | |
|---|---|---|
| JP | 2004-210116 | 7/2004 |
| JP | 2006-83919 | 3/2006 |
| JP | 2008 260466 | 10/2008 |
| JP | 2009 41637 | 2/2009 |
| JP | 2009-126457 | 6/2009 |
| JP | 2010-202124 | 9/2010 |

OTHER PUBLICATIONS

International Search Report Issued Feb. 5, 2013 in PCT/JP12/82249 filed Dec. 12, 2012.

*Primary Examiner* — Erin D Bishop
(74) *Attorney, Agent, or Firm* — Oblon, Spivak, McClelland, Maier & Neustadt, L.L.P.

(57) ABSTRACT

In a vehicle that includes an auxiliary transmission mechanism where a high-speed range and a low-speed range are switchable, a carrier of an auxiliary transmission mechanism is coupled to a motor-generator to allow power transmission. When switching from the high-speed range to the low-speed range, the motor-generator increases a rotational speed of the carrier such that a rotational speed of a low-speed range piece is synchronized with a rotational speed of an input shaft. When switching from the low-speed range to the high-speed range, the motor-generator increases a rotational speed of the carrier such that a rotational speed of an output shaft is synchronized with a rotational speed of the input shaft. This allows range switch with a reduced gear change shock even while the vehicle is running.

10 Claims, 7 Drawing Sheets

VEHICLE POWER TRANSMISSION APPARATUS

TECHNICAL FIELD

The present invention relates to a vehicle power transmission apparatus. Especially, the present invention relates to an improvement of a mechanism that switches a gear ratio in a power transmission path.

BACKGROUND ART

Conventionally, for example, as disclosed below in Patent Literature 1 and Patent Literature 2, a four-wheel drive vehicle that includes an auxiliary transmission to further shift a rotational output shifted by a main transmission is known. This auxiliary transmission generally switches a range between a high-speed range (Hi) and a low-speed range (Lo).

A mechanism that performs this range switch, as disclosed in each Patent Literature, includes a sleeve that is movable along the shaft center of an output shaft of the main transmission. This mechanism switches a power transmission path between a high speed side (a small gear ratio side) and a low speed side (a large gear ratio side) corresponding to a moving position of the sleeve.

Generally, the range switch in the auxiliary transmission is performed in a vehicle stopped state. This is obtained considering a big gear change shock generated by sharply changing the gear ratio in association with the movement of the sleeve in the case where range switch is performed in a vehicle-running state.

CITATION LIST

Patent Literature

PATENT LITERATURE 1: Japanese Unexamined Patent Application Publication No. 2008-260466
PATENT LITERATURE 2: Japanese Unexamined Patent Application Publication No. 2009-41637

SUMMARY OF INVENTION

Technical Problem

However, in the case where the auxiliary transmission switches the range in the vehicle stopped state, the following trouble may occur.

For example, in the case where a vehicle is stopped to switch from the high-speed range to the low-speed range while running on a steep uphill road or during running on a rough road, it may be difficult to smoothly start moving the vehicle after the range switch depending on the road surface condition.

Accordingly, a configuration that changes gears with a reduced gear change shock even while the vehicle is running has been desired.

The present invention has been made in view of the above-described circumstances, and it is an object of the present invention to provide a vehicle power transmission apparatus that allows changing of a gear ratio in a power transmission path regarding a power transmission apparatus that changes gears with a reduced gear change shock even while the vehicle is running.

Solutions to the Problems

The present invention is made to achieve the above-described object, and its solution is based on a vehicle power transmission apparatus that includes a planetary gear mechanism on a power transmission path to which a power from a power source is transmitted. The planetary gear mechanism includes rotational elements that include a rotational element configured to transmit a power to an output shaft. A meshing change operation of a meshing mechanism switches the rotational element configured to transmit the power to the output shaft so as to change a gear ratio on the power transmission path. The vehicle power transmission apparatus includes an electric machine configured to transmit a power to a planetary carrier of the planetary gear mechanism. When the meshing change operation of the meshing mechanism switches the rotational element configured to transmit the power to the output shaft, the apparatus performs a synchronous operation where the power from the electric machine rotates the planetary carrier to set a rotational speed at an input shaft side close to a rotational speed at an output shaft side.

With this specified matter, when the gear ratio on the power transmission path is changed, the power from the electric machine rotates the planetary carrier, and the meshing change operation of the meshing mechanism is performed in a state where the rotational speed at the input shaft side and the rotational speed at the output shaft side are close to each other. This reduces a gear change shock in association with the meshing change operation of the meshing mechanism even in a vehicle running state where the rotational element of the planetary gear mechanism is rotating. Additionally, a special synchronization mechanism is not necessary to reduce the gear change shock. This does not cause a complicated configuration of the meshing mechanism.

The change operation of the gear ratio switches a gear ratio between a low-speed range at a large gear ratio side and a high-speed range at a small gear ratio side. The planetary carrier is coupled to transmit the power to the output shaft in the low-speed range. In this case, a specific operation includes the following operations.

First, when switching from the high-speed range to the low-speed range, the power from the electric machine increases the rotational speed of the planetary carrier to be set close to the rotational speed at the input shaft side.

Further, when switching from the low-speed range to the high-speed range, the power from the electric machine increases the rotational speed of the planetary carrier to set the rotational speed at the output shaft side close to the rotational speed at the input shaft side.

As described above, when switching from the high-speed range to the low-speed range, the power from the electric machine increases the rotational speed of the planetary carrier to be set close to the rotational speed at the input shaft side. This operation smoothly performs switching to the low-speed range. This allows change operation of a gear ratio while the vehicle is running without getting the vehicle stuck.

When switching from the low-speed range to the high-speed range, the power from the electric machine increases the rotational speed of the planetary carrier to set the rotational speed at the output shaft side close to the rotational speed at the input shaft side. This operation also increases the rotational speed of the output shaft in association with an increase in rotational speed of the planetary carrier. This performs a change operation of the gear ratio while inhibiting reduction of the vehicle speed.

The configuration that transmits power of the electric machine to the planetary carrier specifically includes a configuration where the planetary carrier is coupled to a rotating shaft of the electric machine, or a configuration where the planetary gear mechanism includes a ring gear coupled to a rotating shaft of the electric machine.

With the former configuration, the rotational speed of the electric machine coincides with the rotational speed of the planetary carrier. This ensures a satisfactory response characteristic of a change in rotational speed of the planetary carrier and quickly increases the rotational speed of the planetary carrier to a target rotational speed (a synchronous rotational speed). With the latter configuration, the amount of change in rotational speed of the planetary carrier is decreased relative to the amount of change in rotational speed of the ring gear. This allows adjustment of the rotational speed of the planetary carrier with high accuracy.

A mechanism that transmits a power from the electric machine to the planetary carrier, specifically, includes an engage/disengage mechanism configured to switch power transmission and non-power transmission between the planetary carrier and the electric machine. When the meshing change operation of the meshing mechanism switches the rotational element configured to transmit the power to the output shaft, the vehicle power transmission apparatus sets the engage/disengage mechanism to a power transmission state, and rotates the planetary carrier by a power from the electric machine, the vehicle power transmission apparatus is configured to set the engage/disengage mechanism to a non-power transmission state after this switching operation.

That is, when the vehicle runs only by the power from the power source, the engage/disengage mechanism is in a non-power transmission state. Accordingly, the power from the power source is not transmitted to the electric machine. This prevents drag from turning the electric machine. This improves energy efficiency.

A more specific configuration includes a brake unit configured to stop the rotation of the ring gear of the planetary gear mechanism. When the meshing change operation of the meshing mechanism switches the rotational element configured to transmit the power to the output shaft, the vehicle power transmission apparatus releases the brake unit to allow the ring gear to rotate, and the vehicle power transmission apparatus is configured to engage the brake unit to stop the rotation of the ring gear after the switching operation.

Accordingly, in the case where the power of the electric machine rotates the planetary carrier, the brake unit is released to allow the ring gear to rotate. This allows adjustment of the rotational speed of the planetary carrier without limitation by the rotational speed of the sun gear of the planetary gear mechanism. This also allows effectively performing the synchronous operation for setting the rotational speed at the input shaft side close to the rotational speed at the output shaft side. Additionally, after the switching operation, the brake unit is engaged to stop the rotation of the ring gear to prevent the ring gear from rotating by power from the power source. This allows effective transmission of power from the power source to the output shaft and improves energy efficiency.

Additionally, when a required driving power for a vehicle is equal to or more than a predetermined value, a power from the electric machine rotates the planetary carrier to transmit the power from the electric machine to the output shaft.

That is, in addition to the power from the power source, this obtains a driving power for a vehicle by a power (motor assist) from the electric machine and improves running performance of the vehicle. Thus, with this solution, the electric machine doubles as a function for performing the synchronous operation and a function for improving running performance of the vehicle.

Additionally, in a state where the power source is stopped, a power from the electric machine rotates the planetary carrier to transmit the power from the electric machine to the output shaft.

That is, the power from the electric machine alone allows the vehicle to run. This improves a fuel consumption rate. Thus, with this solution, the electric machine doubles as a function for performing the synchronous operation and a function for a vehicle running without using the power source.

Additionally, when a vehicle is decelerated during running, a rotational force of a wheel is transmitted to the electric machine through the power transmission path to set the electric machine to be in a driven state so as to generate electricity by the electric machine.

This allows conversion of a braking force into electrical energy when the vehicle is decelerated during running, for example, to charge the electric storage device. This improves energy efficiency. Thus, with this solution, the electric machine doubles as a function for performing the synchronous operation and a function for regenerating braking energy.

Advantageous Effects of Invention

The present invention rotates the planetary carrier by the power from the electric machine when changing the gear ratio of the power transmission path with the planetary gear mechanism to perform the synchronous operation for setting the rotational speed at the input shaft side close to the rotational speed at the output shaft side. This allows changing gears with a reduced gear change shock even while the vehicle is running.

BRIEF DESCRIPTION OF DRAWINGS

FIG. 4A is a diagram illustrating a four-wheel drive state in a high-speed range mode during steady running, FIG. 4B is a diagram illustrating a four-wheel drive state in the high-speed range mode during motor-assisted running, FIG. 4C is a diagram illustrating a four-wheel drive state in a low-speed range mode during steady running, and FIG. 4D is a diagram illustrating a four-wheel drive state in the low-speed range mode during motor-assisted running.

FIG. 5A is a diagram illustrating a two-wheel drive state in a high-speed range mode during steady running, FIG. 5B is a diagram illustrating a two-wheel drive state in the high-speed range mode during motor-assisted running, FIG. 5C is a diagram illustrating a two-wheel drive state in a low-speed range mode during steady running, and FIG. 5D is a diagram illustrating a two-wheel drive state in the low-speed range mode during motor-assisted running.

DESCRIPTION OF EMBODIMENTS

Hereinafter, a description will be given of an embodiment of the present invention based on the accompanying drawings. In this embodiment, a description will be given of a case where the present invention is applied to a four-wheel drive vehicle based on a FR (front engine rear drive) system in a longitudinal engine configuration. That is, a description will be given of a case where the present invention is applied to a four-wheel drive vehicle based on a rear-wheel drive where a power from an engine is transmitted only to rear wheels (main driving wheels) in a two-wheel drive mode while a power from the engine is transmitted to both of the front wheels (driven wheels) and the rear wheel in a four-wheel drive mode.

Figure 1:
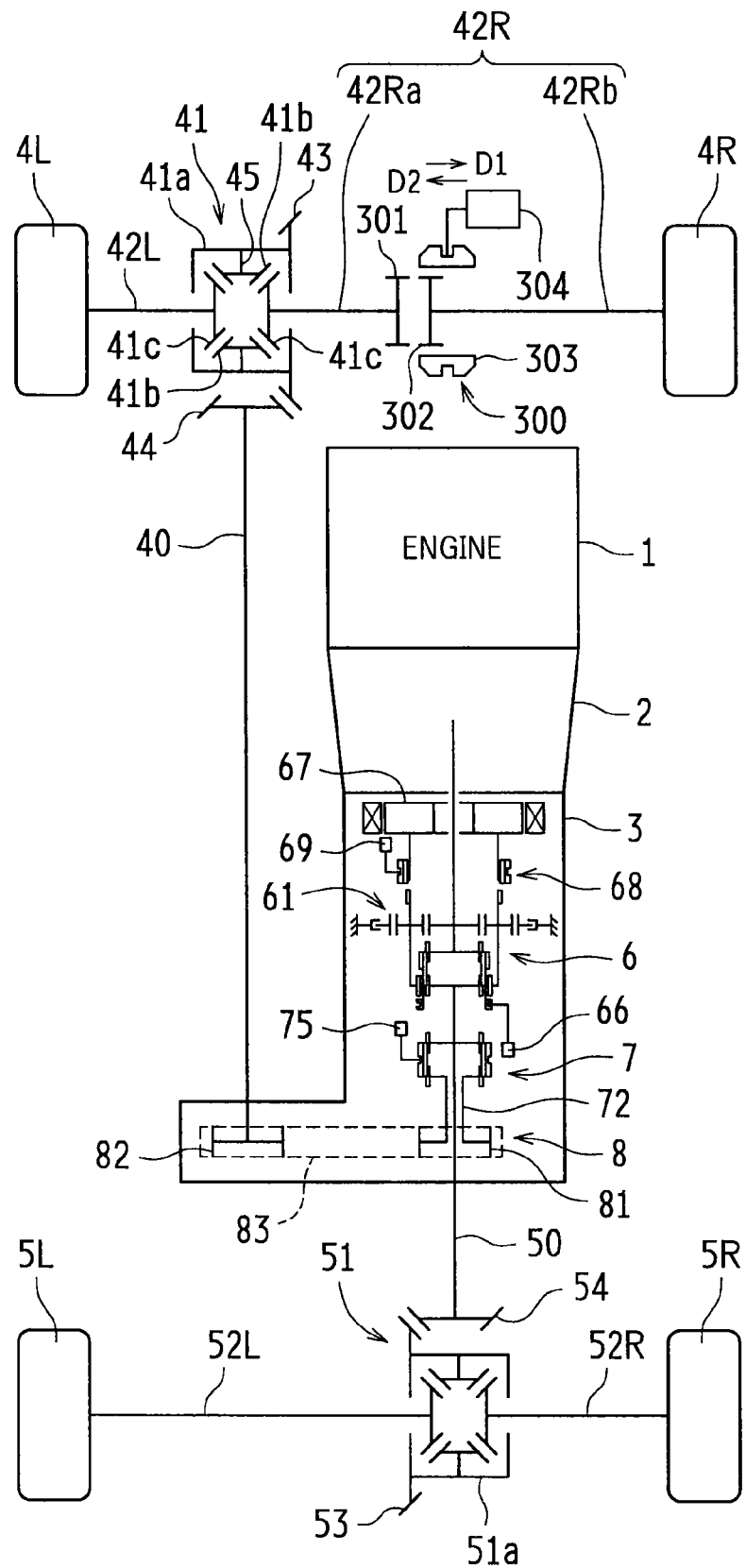
FIG. 1 is a schematic configuration diagram illustrating a power transmission system of a four-wheel drive vehicle according to an embodiment.

FIG. 1 is a schematic configuration diagram illustrating a power transmission system (a power transmission path) of the four-wheel drive vehicle according to this embodiment. As illustrated in FIG. 1, the four-wheel drive vehicle according to this embodiment includes an engine 1, a transmission (a main transmission mechanism) 2, and a transfer case 3. The engine 1 is a power source that generates power for vehicle running. The transmission 2 changes a rotational speed of an output shaft (a crankshaft) of the engine 1. The transfer case 3 can distribute rotational power output from the transmission 2 to a front propeller shaft 40 at front wheels 4L and 4R side and a rear propeller shaft 50 at rear wheels 5L and 5R side.

Specifically, in the case where the vehicle is in the two-wheel drive mode, the rotational power from the engine 1 is output from the transmission 2. Subsequently, this rotational power is transmitted only to the rear propeller shaft 50 by the transfer case 3. The vehicle becomes in a running state where only the rear wheels 5L and 5R are driven. Conversely, in the case where the vehicle is in four-wheel drive mode, the rotational power from the engine 1 is output from the transmission 2. Subsequently, this rotational power is transmitted to each of the front propeller shaft 40 and the rear propeller shaft 50 by the transfer case 3. The vehicle becomes in a running state where the front wheels 4L and 4R and the rear wheels 5L and 5R are both driven.

Hereinafter, descriptions will be specifically given of the engine 1, the transmission 2, the power transmission systems at the front side and the rear side, the transfer case 3, and similar member.

(Engine)

The engine 1 is a known power unit that burns fuel to output power, for example, a gasoline engine, a diesel engine, and an LPG engine. For example, the engine 1 is configured to control a throttle position (a controlled variable for an air intake quantity) of a throttle valve (not shown) disposed at an intake passage, a fuel injection quantity, ignition timing, and similar parameter. These controlled variables are controlled by an ECU 100 (see FIG. 3) described below.

The power source of the four-wheel drive vehicle according to this embodiment may employ an electric machine such as a motor and a motor-generator, or may employ a combination of an internal combustion engine and an electric machine.

(Transmission)

The transmission 2 is disposed at a rear side of the engine 1 via a torque converter (not shown). This transmission 2 is a stepped (planetary gear-type) automatic transmission that sets a gear position using, for example, a plurality of frictional engagement elements such as a clutch and a brake and a planetary gear train. These frictional engagement elements are hydraulic friction engagement elements such as a multiple disc clutch and brake. Engagements of the hydraulic friction engagement elements are controlled by hydraulic actuators. These clutch and brake are switched between an engaged state and a released state by excitation and non-excitation or a current control of a linear solenoid valve of a hydraulic control unit (not shown). Additionally, a transient oil pressure and similar parameter are controlled in the engaged state and the released state. Accordingly, the configuration controls hydraulic pressures supplied to the frictional engagement elements to control the engagement and release of the respective elements. This allows predetermined shift positions (for example, a predetermined shift position among six forward positions, or a reverse position). Accordingly, the transmission 2 performs a gear changing operation to change a torque and a rotational speed in response to the rotational power input from the engine 1 side, and outputs the changed torque and the changed rotational speed to the transfer case 3 side. In the case where a shift lever (not shown) adjacent to a driver's seat is in P (parking) position or N (neutral) position, the transmission 2 releases all the respective frictional engagement elements so as not to transmit the rotational power input from the engine 1 side. This cuts off torque transmission to the output shaft.

The transmission 2 may be a continuously variable transmission (CVT) such as a belt transmission that continuously adjusts a gear ratio. Additionally, a manual transmission may be applied.

(Power Transmission System at the Front Side)

The front propeller shaft 40 extends forward from the transfer case 3 (a specific configuration of this transfer case 3 will be described below). The front propeller shaft 40 is coupled to left and right front drive shafts 42L and 42R via a front differential unit 41 that is a differential mechanism. The left and right front drive shafts 42L and 42R are coupled to the above-described left and right front wheels 4L and 4R.

Specifically, a ring gear 43 is rotatably integrated with a differential case 41a of the front differential unit 41. This ring gear 43 engages a drive pinion gear 44 integrally disposed at a forward end portion of the front propeller shaft 40.

The front differential unit 41 has a configuration that includes a pair of pinion gears 41b and 41b and a pair of side gears 41c and 41c. The pair of pinion gears 41b and 41b are disposed inside of the differential case 41a. The pair of side gears 41c and 41c engage with the respective pinion gears 41b and 41b. The respective pinion gears 41b and 41b are, inside of the differential case 41a, rotatably supported by a pinion gear shaft 45. The pinion gear shaft 45 is disposed in a direction perpendicular to the shaft center direction of the front drive shafts 42L and 42R. That is, the respective pinion gears 41b and 41b revolve around the shaft center of the front drive shafts 42L and 42R together with the differential case 41a, and are rotatable around the shaft center of the pinion gear shaft 45. In the case where a power transmitted through the transfer case 3 and the front propeller shaft 40 is input to the differential case 41a through the ring gear 43, the differential case 41a rotates. In this differential case 41a, the pinion gears 41b and 41b rotate the side gears 41c and 41c while revolving around the shaft center of the front drive shafts 42L and 42R to transmit the power to the front drive shafts 42L and 42R. In the case where a difference of rotation occurs between the left and right front wheels 4L and 4R (the left and right front drive shafts 42L and 42R), for example, when the vehicle is turning, the respective right and left side gears 41c and 41c rotate relatively in association with the rotation of the pinion gears 41b and 41b around the shaft center of the pinion gear shaft 45 to absorb the difference of rotation between the left and right front drive shafts 42L and 42R.

(Power Transmission System at the Rear Side)

The rear propeller shaft 50 extends backward from the transfer case 3. The rear propeller shaft 50 is coupled to left and right rear drive shafts 52L and 52R via a rear differential unit 51 that is a differential mechanism. The left and right rear drive shafts 52L and 52R are coupled to the above-described left and right rear wheels 5L and 5R.

Specifically, a ring gear 53 is rotatably integrated with the differential case 51a of the rear differential unit 51. This ring gear 53 engages a drive pinion gear 54 integrally disposed at a rear end portion of the rear propeller shaft 50.

The rear differential unit 51 has a similar configuration to that of the above-described front differential unit 41. Therefore, the configuration of the rear differential unit 51 will not be further elaborated here.

(Transfer Case)

Figure 2:
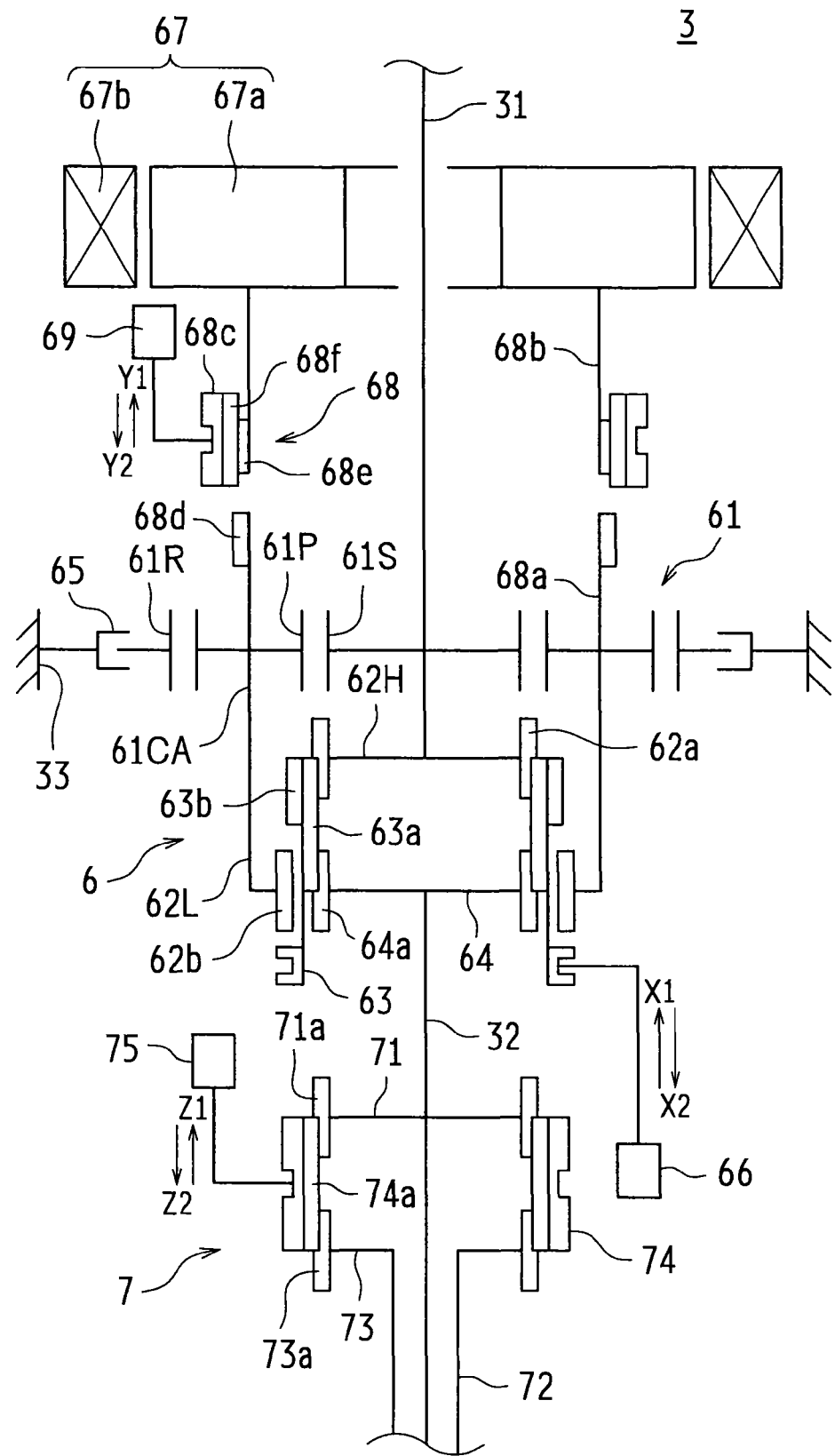
FIG. 2 is an enlarged view illustrating a configuration of a transfer case.

The transfer case 3 is disposed at a rear side of the transmission 2, and includes an input shaft 31 coupled to an output shaft of the transmission 2 (see FIG. 2 illustrating an enlarged configuration of the transfer case 3). Additionally, the transfer case 3 includes an auxiliary transmission mechanism 6, a 2WD/4WD switching mechanism 7, and a power distribution mechanism 8 (FIG. 2 illustrates the auxiliary transmission mechanism 6 and the 2WD/4WD switching mechanism 7 only). Hereinafter, descriptions will be given of the respective mechanisms 6, 7, and 8.

(Auxiliary Transmission Mechanism)

The auxiliary transmission mechanism 6 has a configuration that can switch to any one of speed ranges between a high-speed range and a low-speed range by operation of a driver with a range switch lever 97 (see FIG. 3) disposed adjacent to the driver's seat. During normal running, the auxiliary transmission mechanism 6 is switched to the high-speed range. Conversely, in the case of, for example, off-road running, especially, running on an uphill road or a rough road, the auxiliary transmission mechanism 6 is switched to the low-speed range. In this low-speed range, a large gear ratio (larger than a gear ratio in the high-speed range) is set inside of the auxiliary transmission mechanism 6. Reduction in rotational speed of the rotational power output from the transmission 2 increases a torque. Here, not only the range switch lever 97, but another operating unit (such as a switch) may be configured to switch between the high-speed range and the low-speed range. Alternatively, the configuration may automatically switch between the high-speed range and the low-speed range corresponding to a road surface condition or similar parameter.

As illustrated in FIG. 2, the auxiliary transmission mechanism 6 includes a planetary gear mechanism 61, a high-speed range piece 62H, a low-speed range piece 62L, a first sleeve 63, an output hub 64, and similar member.

The planetary gear mechanism 61 employs, for example, a single-pinion planetary gear mechanism. Specifically, the planetary gear mechanism 61 includes rotational elements of a sun gear 61S, a ring gear 61R, a plurality of pinion gears 61P, and a planetary carrier (hereinafter referred to as a carrier) 61CA. The ring gear 61R is concentrically disposed with the sun gear 61S. The plurality of pinion gears 61P engage the sun gear 61S and the ring gear 61R. The carrier 61CA rotatably and revolvably supports the plurality of pinion gears 61P.

The sun gear 61S is coupled to the input shaft 31 of the transfer case 3 to rotate integrally. Additionally, the high-speed range piece 62H is rotatably integrated with the sun gear 61S but cannot move in the shaft center direction (for example, the high-speed range piece 62H is integrally formed with the sun gear 61S). The high-speed range piece 62H includes an outer peripheral surface where a plurality of external teeth (splines) 62a are equally spaced over a circumferential direction of the outer peripheral surface.

The ring gear 61R can be selectively secured to a housing 33 of the transfer case 3 by a brake 65. This brake 65 is a hydraulic friction engagement element that is engaged and released by a hydraulic control circuit 400 (see FIG. 3). In a state where this brake 65 is engaged, rotation of the ring gear 61R is forcibly stopped. Conversely, in a state where the brake 65 is released, the rotation of the ring gear 61R is allowed. This brake 65 does not only switch between engagement and release but can also be in a semi-engagement state by hydraulic control of the hydraulic control circuit 400 to adjust an engaging force of the brake 65.

The carrier 61CA includes the low-speed range piece 62L that is rotatably integrated with the carrier 61CA but cannot move in the shaft center direction (for example, rotatably integrated by spline fitting). The low-speed range piece 62L includes an inner peripheral surface where a plurality of internal teeth (splines) 62b are equally spaced over a circumferential direction of the inner peripheral surface. Additionally, a position of the low-speed range piece 62L is set to a position at a rear side with respect to a position of the high-speed range piece 62H.

The first sleeve 63 is externally mounted to integrally rotate with the output shaft 32 coaxially with the input shaft 31 via the output hub 64. Specifically, the output hub 64 is rotatably integrated with a forward end portion of the output shaft 32 but cannot move in the shaft center direction of the output hub 64. The output hub 64 includes an outer peripheral surface where a plurality of external teeth (splines) 64a are equally spaced over a circumferential direction of the outer peripheral surface. Conversely, the first sleeve 63 includes an inner peripheral surface where a plurality of internal teeth (splines) 63a are equally spaced over a circumferential direction of the inner peripheral surface. The plurality of internal teeth 63a extend approximately in the entire length of the first sleeve 63 in the shaft center direction. The internal teeth 63a engage the external teeth 64a of the output hub 64. Accordingly, the first sleeve 63 is externally mounted to integrally rotate with the output shaft 32 via the output hub 64.

The internal teeth 63a of the first sleeve 63 are engageable with the external teeth 62a of the high-speed range piece 62H (FIG. 2 illustrates a state where the internal teeth 63a of the first sleeve 63 engage the external teeth 62a of the high-speed range piece 62H). Additionally, the first sleeve 63 includes an outer peripheral surface where a plurality of external teeth (splines) 63b are equally spaced over a circumferential direction of the outer peripheral surface. The external teeth 63b are engageable with the internal teeth 62b of the low-speed range piece 62L (FIG. 2 illustrates a state where the external teeth 63b of the first sleeve 63 do not engage the internal teeth 62b of the low-speed range piece 62L). A forming range of the external teeth 63b in the first sleeve 63 is only in a front side portion of the first sleeve 63 in the shaft center direction.

Figure 4A:
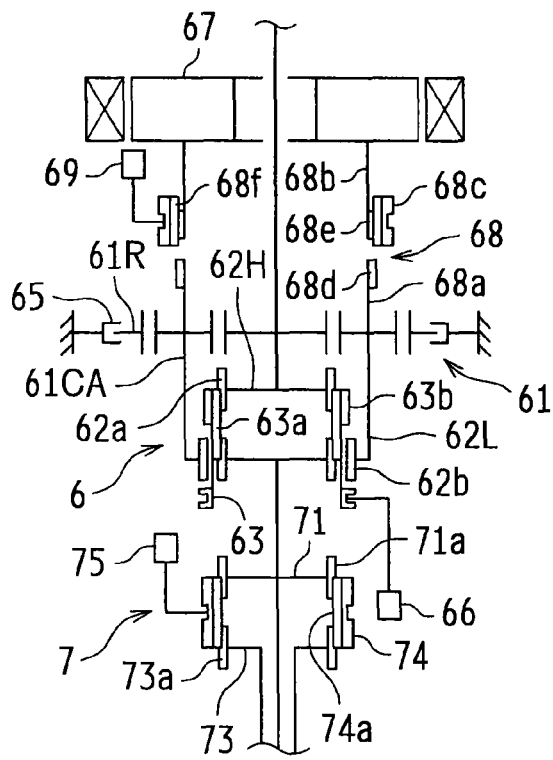
FIGS. 4A to 4D are schematic configuration diagrams each illustrating a four-wheel drive state of the transfer case.
Figure 4B:
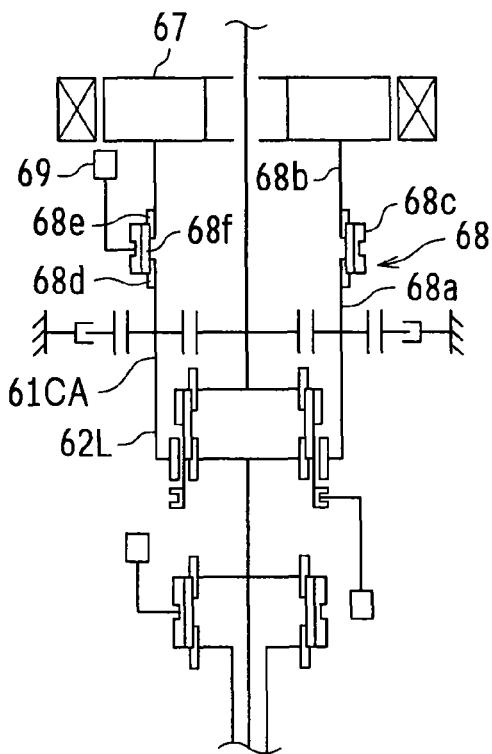
Figure 4C:
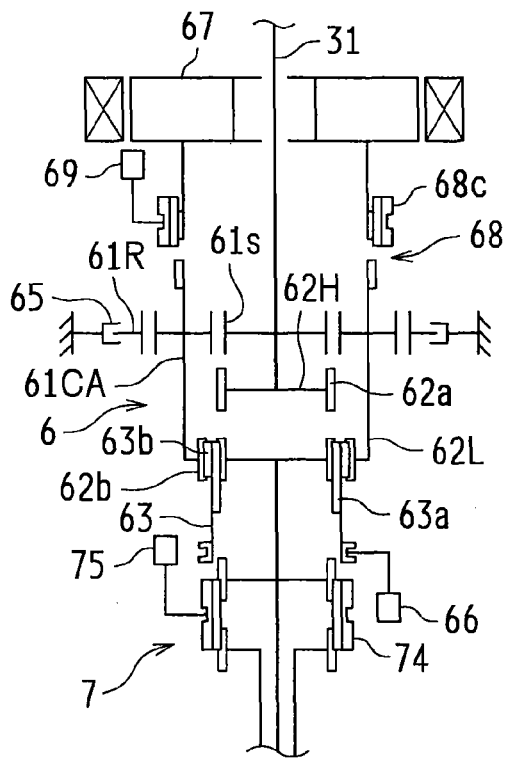

The first sleeve 63 is configured to be slidable parallel to the output shaft 32 by a range switch actuator 66. That is, the range switch actuator 66 allows the first sleeve 63 to move between a first slide position and a second slide position. The first slide position is, as illustrated in FIG. 2 and FIG. 4A, a position where the internal teeth 63a of the first sleeve 63 engage the external teeth 62a of the high-speed range piece 62H while the external teeth 63b of the first sleeve 63 do not engage the internal teeth 62b of the low-speed range piece 62L. The second slide position is, as illustrated in FIG. 4C, a position where the external teeth 63b of the first sleeve 63 engage the internal teeth 62b of the low-speed range piece 62L while the internal teeth 63a of the first sleeve 63 do not engage the external teeth 62a of the high-speed range piece 62H.

The range switch actuator 66 includes, for example, an electric motor, and includes a transmission mechanism that decelerates a rotational power to be generated and converts the rotational power into a linear driving power. The range switch actuator 66 is configured to transmit the linear driving power to the first sleeve 63. This range switch actuator 66 may be a hydraulic actuator.

The first sleeve 63, the range switch actuator 66, the output hub 64, the high-speed range piece 62H, the low-speed range piece 62L, and similar member constitute a meshing mechanism of the present invention. The meshing mechanism switches rotational elements that can transmit power to the output shaft 32 among the rotational elements constituting the planetary gear mechanism 61 so as to change a gear ratio in the power transmission path.

Additionally, regarding the auxiliary transmission mechanism 6, in the case where the high-speed range is selected by, for example, an operation of the range switch lever 97 by a driver, the range switch actuator 66 slides the first sleeve 63 (slid toward the first slide position) in X1 direction of FIG. 2. When the first sleeve 63 is slid to the first slide position, as illustrated in FIG. 2, the internal teeth 63a of the first sleeve 63 engage the external teeth 62a of the high-speed range piece 62H. This allows a power transmission path for the high-speed range where a torque input to the input shaft 31 is transmitted to the high-speed range piece 62H, the first sleeve 63, the output hub 64, and the output shaft 32 in this order. Then, the auxiliary transmission mechanism 6 is switched to the high-speed range. In this high-speed range, an output rotational element of the planetary gear mechanism 61 is the sun gear 61S. Additionally, the input shaft 31 and the output shaft 32 are directly coupled together.

Conversely, in the case where the low-speed range is selected by, for example, an operation of the range switch lever 97 by the driver, the range switch actuator 66 slides the first sleeve 63 (slid toward the second slide position) in X2 direction of FIG. 2. When the first sleeve 63 is slid to the second slide position, as illustrated in FIG. 4C, the external teeth 63b of the first sleeve 63 engage the internal teeth 62b of the low-speed range piece 62L. This allows a power transmission path for the low-speed range where a torque input to the input shaft 31 is transmitted to the sun gear 61S, the carrier 61CA, the low-speed range piece 62L, the first sleeve 63, the output hub 64, and the output shaft 32 in this order. Subsequently, the auxiliary transmission mechanism 6 is switched to the low-speed range. In this low-speed range, the output rotational element of the planetary gear mechanism 61 is the carrier 61CA. Additionally, the rotational speed of the input shaft 31 is decelerated by the planetary gear mechanism 61, and output to the output shaft 32.

The output shaft 32 where the output hub 64 is mounted is coupled to the rear propeller shaft 50 (see FIG. 1) to rotate integrally. The rotational power output from the transfer case 3 is transmitted to the rear propeller shaft 50 from the output shaft 32.

As a feature of this embodiment, the carrier 61CA can be coupled to a motor-generator (an electric machine) 67 via an engage/disengage mechanism 68.

This motor-generator 67 is an AC synchronous generator that includes a rotor 67a and a stator 67b. The rotor 67a is formed of a permanent magnet. The stator 67b is wound with a three-phase winding. The motor-generator 67 functions as an electric machine (the electric motor) and also as an electric generator.

Figure 3:
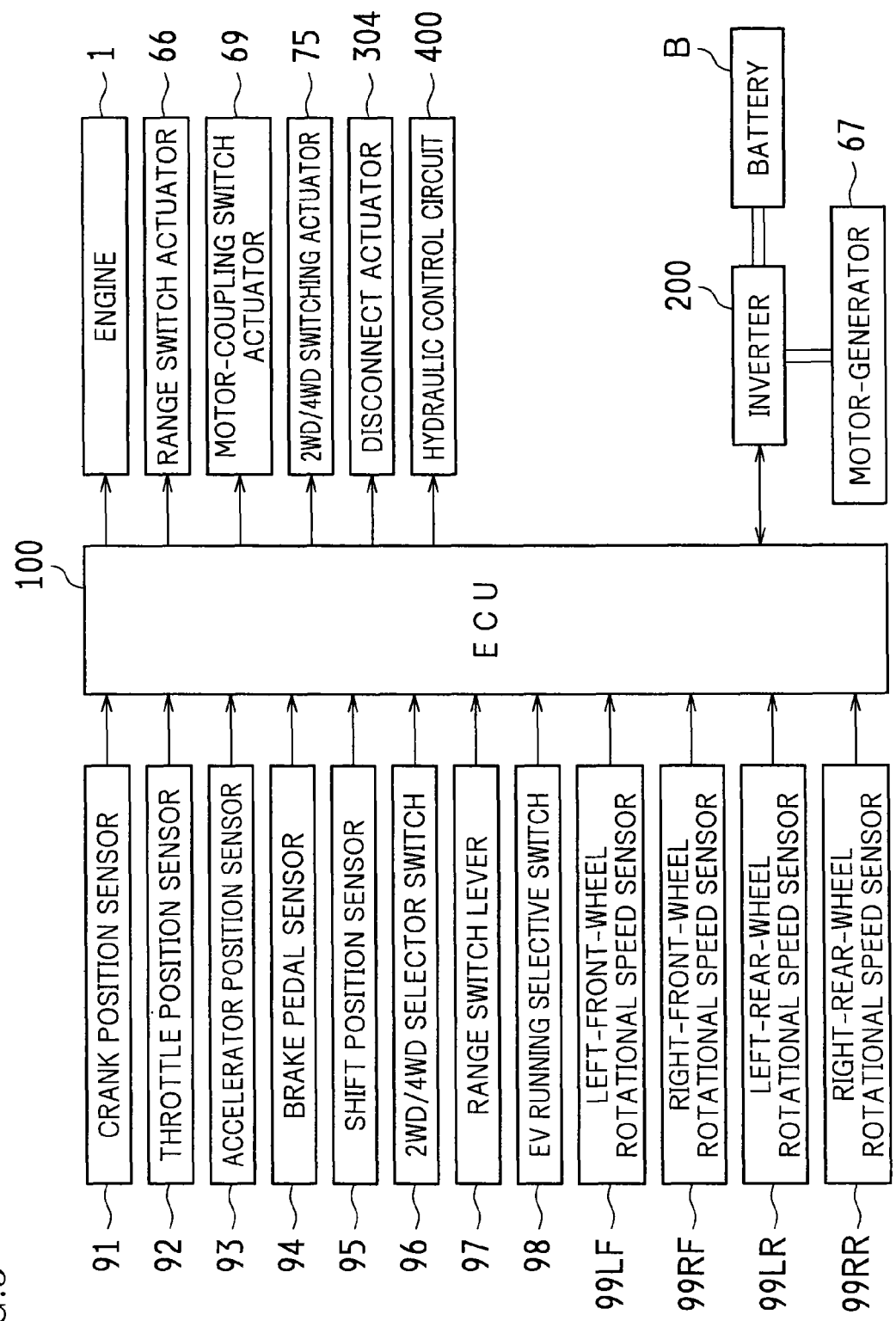
FIG. 3 is a block diagram illustrating a schematic configuration of a control system in the four-wheel drive vehicle.

This motor-generator 67 is coupled to a battery (an electric storage device) B via an inverter 200 (see FIG. 3). The inverter 200 is controlled by the ECU 100. This control of the inverter 200 allows setting either regeneration or power running (assist) of the motor-generator 67. During the regeneration of the motor-generator 67, generated electric power is charged to the battery B through the inverter 200. Driving electric power for the motor-generator 67 is supplied through the inverter 200 from the battery B.

The engage/disengage mechanism 68 switches transmission and non-transmission of the power between the motor-generator 67 and the carrier 61CA. The engage/disengage mechanism 68 includes a carrier side piece 68a, a motor side piece 68b, and a second sleeve 68c. The carrier side piece 68a is rotatably integrated with the carrier 61CA. The motor side piece 68b is rotatably integrated with the rotor 67a of the motor-generator 67. The second sleeve 68c is movable along the shaft center of the input shaft 31. Hereinafter, a specific description will be given.

The carrier side piece 68a and the motor side piece 68b have approximately the same outer diameter size, and include outer peripheral surfaces where a plurality of external teeth (splines) 68d and 68e are equally spaced over circumferential directions of the respective outer peripheral surfaces. Conversely, the second sleeve 68c includes an inner peripheral surface where a plurality of internal teeth (splines) 68f equally spaced over a circumferential direction of the inner peripheral surface. The plurality of internal teeth 68f extend approximately in the entire length of the second sleeve 68c in the shaft center direction.

The second sleeve 68c is slidable parallel to the input shaft 31 by a motor-coupling switch actuator 69. That is, this motor-coupling switch actuator 69 allows the second sleeve 68c to move between the first slide position and the second slide position. The first slide position is, as illustrated in FIG. 2 and FIG. 4A, a position where the internal teeth 68f of the second sleeve 68c engage the external teeth 68e of the motor side piece 68b without engaging the external teeth 68d of the carrier side piece 68a. The second slide position is, as illustrated in FIG. 4B, a position where the internal teeth 68f of the second sleeve 68c engage both the external teeth 68e of the motor side piece 68b and the external teeth 68d of the carrier side piece 68a, respectively.

The motor-coupling switch actuator 69, similarly to the range switch actuator 66, includes, for example, an electric motor, and includes a transmission mechanism that decelerates a rotational power to be generated and converts the rotational power into a linear driving power. The motor-coupling switch actuator 69 is configured to transmit the linear driving power to the second sleeve 68c. This motor-coupling switch actuator 69 may be a hydraulic actuator.

In the case where the second sleeve 68c is slid in Y1 direction of FIG. 2 and arranged in the first slide position, power is not transmitted between the motor-generator 67 and the carrier 61CA. Conversely, in the case where the second sleeve 68c is slid in Y2 direction of FIG. 2 and arranged in the second slide position, the power can be transmitted between the motor-generator 67 and the carrier 61CA. In this state, when the motor-generator 67 is driven to generate a motor torque, the motor torque is transmitted to the motor side piece 68b, the second sleeve 68c, the carrier side piece 68a, the carrier 61CA, and the low-speed range piece 62L in this order. This controls a rotational speed of the motor-generator 67 to adjust a rotational speed of the carrier 61CA. As a result, this configuration is configured to adjust a rotational speed of the low-speed range piece 62L.

In this state, a motor torque can be transmitted to the output shaft 32. This allows running by motor assistance when the engine 1 is operating or EV running that uses the motor torque only as a driving power for running. That is, in the case of the high-speed range, the motor torque is transmitted to the motor side piece 68b, the second sleeve 68c, the carrier side piece 68a, the carrier 61CA, the sun gear 61S, the high-speed range piece 62H, the first sleeve 63, the output hub 64, and the output shaft 32 in this order. In the case of the low-speed range, the motor torque is transmitted to the motor side piece 68b, the second sleeve 68c, the carrier side piece 68a, the carrier 61CA, the low-speed range piece 62L, the first sleeve 63, the output hub 64, and the output shaft 32 in this order. Additionally, in this state where the power can be transmitted between the motor-generator 67 and the carrier 61CA, turning the motor-generator 67 into a driven state while the vehicle is running also allows regenerative operation where the motor-generator 67 generates electricity.

(2WD/4WD Switching Mechanism)

The 2WD/4WD switching mechanism 7 is disposed at a rear side of the auxiliary transmission mechanism 6, and includes an output shaft side piece 71, a four-wheel drive piece 73, and a third sleeve 74. The output shaft side piece 71 is rotatably integrated with the output shaft 32. The four-wheel drive piece 73 is mounted to integrally rotate with a cylindrical member 72 disposed in an outer perimeter of the output shaft 32. The third sleeve 74 is movable along the shaft center of the output shaft 32. Hereinafter, a description will be specifically given.

The output shaft side piece 71 and four-wheel drive piece 73 have approximately the same outer diameter size, and include outer peripheral surfaces where a plurality of external teeth (splines) 71a and 73a are equally spaced over circumferential directions of the respective outer peripheral surfaces. Conversely, the third sleeve 74 includes an inner peripheral surface where a plurality of internal teeth (splines) 74a is equally spaced over a circumferential direction of the inner peripheral surface. The plurality of internal teeth 74a extend approximately in the entire length of the third sleeve 74 in the shaft center direction.

Figure 5A:
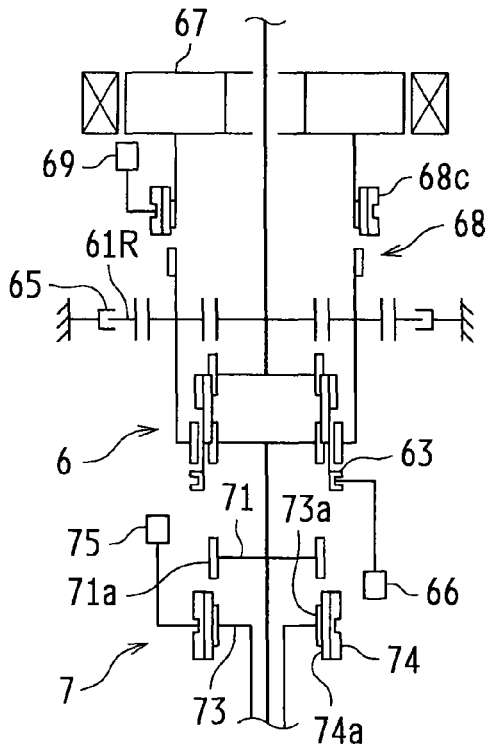
FIGS. 5A to 5D are schematic configuration diagrams each illustrating a two-wheel drive state of the transfer case.

The third sleeve 74 is slidable parallel to the output shaft 32 by a 2WD/4WD switching actuator 75. That is, this 2WD/4WD switching actuator 75 allows the third sleeve 74 to move between the first slide position and the second slide position. The first slide position is, as illustrated in FIG. 2 and FIG. 4A, a position where the internal teeth 74a of the third sleeve 74 engage the respective external teeth 71a and 73a of the output shaft side piece 71 and the four-wheel drive piece 73. The second slide position is, as illustrated in FIG. 5A, a position where the internal teeth 74a of the third sleeve 74 engage the external teeth 73a of the four-wheel drive piece 73 without engaging the external teeth 71a of the output shaft side piece 71.

The 2WD/4WD switching actuator 75 is, similarly to the respective actuators 66 and 69, includes an electric motor and similar member, and includes a transmission mechanism that decelerates a rotational power to be generated and converts the rotational power into a linear driving power. The 2WD/4WD switching actuator 75 is configured to transmit the linear driving power to the third sleeve 74. Additionally, this 2WD/4WD switching actuator 75 may be a hydraulic actuator.

In the case where the third sleeve 74 is slid in Z1 direction of FIG. 2 and arranged in the first slide position, power can be transmitted between the output shaft side piece 71 and the four-wheel drive piece 73. In this state, a part of the power transmitted to the output shaft 32 is transmitted to the power distribution mechanism 8 through the four-wheel drive piece 73. This is a four-wheel drive state where the power can be transmitted to the front propeller shaft 40. Conversely, in the case where the third sleeve 74 is slid in Z2 direction of FIG. 2 and arranged in the second slide position, power is not transmitted between the output shaft side piece 71 and the four-wheel drive piece 73. In this state, the power transmitted to the output shaft 32 is transmitted only to the rear propeller shaft 50, which is a two-wheel drive state.

(Power Distribution Mechanism)

The power distribution mechanism 8 includes, as illustrated in FIG. 1, a drive sprocket 81, a driven sprocket 82, a chain 83, and similar member. The chain 83 is wound between the drive sprocket 81 and the driven sprocket 82. The drive sprocket 81 is rotatably integrated with the four-wheel drive piece 73 via the cylindrical member 72 of the 2WD/4WD switching mechanism 7. The driven sprocket 82 is coupled to the front propeller shaft 40 to rotate integrally. Since the chain 83 is wound on the respective sprockets 81 and 82, in the power distribution mechanism 8, one part of the power (which may be a motor torque from the motor-generator 67) from the engine 1 is transmitted to the rear propeller shaft 50 in the case where the 2WD/4WD switching mechanism 7 is in the four-wheel drive state. The other part of the power is transmitted to the driven sprocket 82 via the drive sprocket 81 and the chain 83. Subsequently, this power is transmitted to the front propeller shaft 40.

(Disconnect Mechanism)

In the four-wheel drive vehicle according to this embodiment, as illustrated in FIG. 1, a disconnect mechanism 300 is disposed at the front drive shaft 42R on the right side among the left and right front drive shafts 42L and 42R. This disconnect mechanism 300 is configured to switch between a transmission state and a non-transmission state (a disconnected state). In the transmission state, a torque is transmitted between the front differential unit 41 and the right front wheel 4R. In the non-transmission state, the torque is not transmitted.

Specifically, the front drive shaft 42R on the right side is divided into a differential-side front drive shaft 42Ra at the front differential unit 41 side and a wheel-side front drive shaft 42Rb at the right front wheel 4R side. The disconnect mechanism 300 includes a differential-side engaging plate 301, a front-wheel-side engaging plate 302, a disconnect sleeve 303, and similar member. The differential-side engaging plate 301 is mounted on an outer end of the differential-side front drive shaft 42Ra in a vehicle-width direction. The front-wheel-side engaging plate 302 is mounted on an inner end of the wheel-side front drive shaft 42Rb in the vehicle-width direction. The disconnect sleeve 303 switches engagement and non-engagement between the differential-side engaging plate 301 and the front-wheel-side engaging plate 302.

The differential-side engaging plate 301 and the front-wheel-side engaging plate 302 have the same diameters that each include an outer peripheral surface where external teeth (not shown) are disposed. Conversely, on the inner peripheral surface of the disconnect sleeve 303, internal teeth (not shown) are formed. The internal teeth are engageable with the external teeth formed on the respective outer peripheral surfaces of the differential-side engaging plate 301 and the front-wheel-side engaging plate 302. The disconnect sleeve 303 is configured to slidably move in a direction along the shaft center of the front drive shaft 42R by the disconnect actuator 304. This allows the disconnect sleeve 303 to slidably move between the following positions. In one position (a position illustrated in FIG. 1), the disconnect sleeve 303 engages the front-wheel-side engaging plate 302 (or the differential-side engaging plate 301) only. In the other position, the disconnect sleeve 303 engages both the front-wheel-side engaging plate 302 and the differential-side engaging plate 301. In the case where this disconnect sleeve 303 is arranged in the position where the disconnect sleeve 303 engages one engaging plate (such as the front-wheel-side engaging plate 302) only, torque is not transmitted to the right front wheel 4R from the front differential unit 41 (which is the non-transmission state; a released state of the disconnect mechanism 300). In contrast, in the case where the disconnect sleeve 303 is arranged in the position where the disconnect sleeve 303 engages both the front-wheel-side engaging plate 302 and the differential-side engaging plate 301, the torque can be transmitted to the right front wheel 4R from the front differential unit 41 (an engaged state of the disconnect mechanism 300). The disconnect actuator 304 may employ, for example, an electrical actuator driven by an electrical motor or a hydraulic actuator.

This disconnect mechanism 300 is switched to the transmission state when the vehicle is in the four-wheel drive state while being switched to the non-transmission state when the vehicle is in the two-wheel drive state. For more details, when the vehicle is switched to the two-wheel drive state from the four-wheel drive state, the disconnect mechanism 300 is switched to the non-transmission state. Conversely, when the vehicle is switched to the four-wheel drive state from the two-wheel drive state, the disconnect mechanism 300 is switched to the transmission state.

Specifically, in the case where the driver operates a 2WD/4WD selector switch 96 (see FIG. 3) to select the two-wheel drive mode, the disconnect sleeve 303 is slid in D1 direction of FIG. 1. Accordingly, the engagement between the sleeve 303 and the differential-side engaging plate 301 is released. The coupling between the engaging plates 301 and 302 is released. Therefore, the front differential unit 41 side and the right front wheel 4R side are separated. The disconnect mechanism 300 is switched to the non-transmission state where a torque is not transmitted between the front differential unit 41 and the right front wheel 4R. In this non-transmission state, the respective left and right front wheels 4L and 4R rotate but the third sleeve 74 of the 2WD/4WD switching mechanism 7 is arranged in the second slide position (in a state where a power is not transmitted to the four-wheel drive piece 73). In association with this state, the differential case 41a of the front differential unit 41, the front propeller shaft 40, respective sprockets 81 and 82 of the power distribution mechanism 8, and similar member become in a non-rotation state.

Conversely, in the case where the driver operates the 2WD/4WD selector switch 96 to select the four-wheel drive mode, the disconnect sleeve 303 is slid in D2 direction of FIG. 1. Accordingly, the disconnect sleeve 303 and the respective engaging plates 301 and 302 engage with one another to couple the engaging plates 301 and 302 together via the disconnect sleeve 303. Therefore, the front differential unit 41 side and the right front wheel 4R side are integrally coupled together. The disconnect mechanism 300 is switched to the transmission state where a torque can be transmitted between the front differential unit 41 and the right front wheel 4R.

(ECU)

The ECU 100 is an electronic control device that performs an operation control of the engine 1, controls of the respective actuators 66, 69, 75, and 304, a torque control of the motor-generator 67, and similar control. The ECU 100 includes a central processing unit (CPU), a read only memory (ROM), a random access memory (RAM), a backup RAM, and similar member.

The ROM stores, for example, various control programs and maps referenced when the various control programs are executed. The CPU executes arithmetic processes based on the various control programs and the maps stored in the ROM. The RAM is a memory that temporarily stores results of the arithmetic operations in the CPU, data input from respective sensors, and similar data. The backup RAM is a non-volatile memory that stores data to be saved, for example, when the engine 1 is stopped, and similar data.

As illustrated in FIG. 3, the ECU 100 is coupled to, for example, a crank position sensor 91, a throttle position sensor 92, an accelerator position sensor 93, a brake pedal sensor 94, a shift position sensor 95, the 2WD/4WD selector switch 96, the range switch lever 97, an EV running selective switch 98, a left-front-wheel rotational speed sensor 99LF, a right-front-wheel rotational speed sensor 99RF, a left-rear-wheel rotational speed sensor 99LR, and a right-rear-wheel rotational speed sensor 99RR. The crank position sensor 91 sends a pulse signal each time the crankshaft of the engine 1 rotates by a predetermined angle. The throttle position sensor 92 detects the degree of opening of the throttle valve disposed in the intake passage of the engine 1. The accelerator position sensor 93 detects an accelerator position Acc that is an amount an accelerator pedal is depressed. The brake pedal sensor 94 detects a pedal force (brake pedal force) on the brake pedal. The shift position sensor 95 detects a shift lever position of the transmission 2. The 2WD/4WD selector switch 96 is disposed adjacent to the driver's seat, and operated by the driver. Similarly, the range switch lever 97 is disposed adjacent to the driver's seat, and operated by the driver. The EV running selective switch 98 allows selection of EV running (running where only the motor-generator 67 is used as the power source). The left-front-wheel rotational speed sensor 99LF detects a rotational speed of the left front wheel 4L. The right-front-wheel rotational speed sensor 99RF detects a rotational speed of the right front wheel 4R. The left-rear-wheel rotational speed sensor 99LR detects a rotational speed of the left rear wheel 5L. The right-rear-wheel rotational speed sensor 99RR detects a rotational speed of the right rear wheel 5R. In addition, the ECU 100 is coupled to a water temperature sensor, an air flow meter, a G-sensor, and similar sensor. The water temperature sensor detects an engine coolant temperature. The air flow meter detects an air intake quantity. The G-sensor detects an acceleration of the vehicle in the front-rear direction. Respective signals from these sensors are input to the ECU 100. As necessary, a rotational speed sensor is disposed to detect, for example, a rotational speed of the input shaft 31, a rotational speed of the output shaft 32, and a rotational speed of the high-speed range piece 62H. Signals from this rotational speed sensor are input to the ECU 100.

The ECU 100 performs various controls for the engine 1 including, for example, a throttle position control (an air intake quantity control), a fuel injection quantity control, an ignition timing control for the engine 1 based on the output signals of the various sensors. Additionally, the ECU 100 performs controls of the respective actuators 66, 69, 75, and 304, a torque control of the motor-generator 67, and similar control corresponding to the vehicle running state or an operation (operations of the switches 96 and 98 and the lever 97) by the driver. Furthermore, the ECU 100 controls the hydraulic control circuit 400 to switch between engagement and release of the brake 65 and to adjust the engaging force of the brake 65.

(Vehicle Running Mode)

Next, descriptions will be given of the running modes of the four-wheel drive vehicle configured as described above.

The four-wheel drive vehicle according to this embodiment can run in respective running modes as follows corresponding to slide-movement positions of the respective sleeves 63, 68c, and 74 and the torque control of the motor-generator 67. Hereinafter, a description will be specifically given. Generally, the auxiliary transmission mechanism 6 is held at the high-speed range in the case of the two-wheel drive state of the vehicle. The auxiliary transmission mechanism 6 is switchable between the high-speed range and the low-speed range in the case of the four-wheel drive state. In contrast, the four-wheel drive vehicle according to this embodiment is switchable between the high-speed range and the low-speed range even in the case of the two-wheel drive state.

(Four-Wheel-Drive High-Speed Range Mode)

First, a description will be given of a four-wheel-drive high-speed range mode.

FIG. 4A is a schematic configuration diagram of the transfer case 3 during steady running (during running that uses an output torque from the engine 1 only) in this four-wheel-drive high-speed range mode.

As illustrated in FIG. 4A, in the four-wheel-drive high-speed range mode, the range switch actuator 66 of the auxiliary transmission mechanism 6 arranges the first sleeve 63 in the first slide position. The internal teeth 63a of the first sleeve 63 and the external teeth 62a of the high-speed range piece 62H engage with one another. The external teeth 63b of the first sleeve 63 do not engage the internal teeth 62b of the low-speed range piece 62L. The 2WD/4WD switching actuator 75 of the 2WD/4WD switching mechanism 7 arranges the third sleeve 74 in the first slide position. The internal teeth 74a of the third sleeve 74 engage both the external teeth 71a and 73a of the output shaft side piece 71 and the four-wheel drive piece 73, respectively. Furthermore, the motor-coupling switch actuator 69 of the engage/disengage mechanism 68 arranges the second sleeve 68c in the first slide position. The internal teeth 68f of the second sleeve 68c engage the external teeth 68e of the motor side piece 68b without engaging the external teeth 68d of the carrier side piece 68a.

In this four-wheel-drive high-speed range mode, the third sleeve 74 in the first slide position allows four-wheel-drive running of the vehicle. The first sleeve 63 in the first slide position sets the high-speed range where deceleration is not performed in the auxiliary transmission mechanism 6. Additionally, since the second sleeve 68c is arranged in the first slide position, power is not transmitted between the motor-generator 67 and the carrier 61CA of the planetary gear mechanism 61.

In this four-wheel-drive high-speed range mode, as illustrated in FIG. 4B, when the motor-coupling switch actuator 69 of the engage/disengage mechanism 68 moves the second sleeve 68c to the second slide position, the internal teeth 68f of the second sleeve 68c is arranged in a position where the internal teeth 68f engage both the external teeth 68e of the motor side piece 68b and the external teeth 68d of the carrier side piece 68a, respectively. In this state, when the motor-generator 67 is driven to generate a motor torque, the motor torque is transmitted to the carrier 61CA to adjust a rotational speed of the carrier 61CA. Additionally, a rotational speed of the low-speed range piece 62L becomes adjustable. Also, four-wheel-drive running by motor assist and EV running by four-wheel driving are possible.

(Four-Wheel-Drive Low-Speed Range Mode)

Next, a description will be given of a four-wheel-drive low-speed range mode.

FIG. 4C is a schematic configuration diagram of the transfer case 3 during steady running in the four-wheel-drive low-speed range mode.

As illustrated in FIG. 4C, in the four-wheel-drive low-speed range mode, the range switch actuator 66 of the auxiliary transmission mechanism 6 arranges the first sleeve 63 in the second slide position. The external teeth 63b of the first sleeve 63 engage the internal teeth 62b of the low-speed range piece 62L while the internal teeth 63a of the first sleeve 63 do not engage the external teeth 62a of the high-speed range piece 62H. Additionally, similarly to the case of the four-wheel-drive high-speed range mode, the 2WD/4WD switching actuator 75 of the 2WD/4WD switching mechanism 7 arranges the third sleeve 74 in the first slide position. The motor-coupling switch actuator 69 of the engage/disengage mechanism 68 arranges the second sleeve 68c in the first slide position.

In this four-wheel-drive low-speed range mode, the third sleeve 74 in the first slide position allows four-wheel-drive running of the vehicle. The first sleeve 63 in the second slide position sets the low-speed range where deceleration is performed in the auxiliary transmission mechanism 6. Additionally, in the case where the second sleeve 68c is arranged in the first slide position, power is not transmitted between the motor-generator 67 and the carrier 61CA of the planetary gear mechanism 61.

Figure 4D:
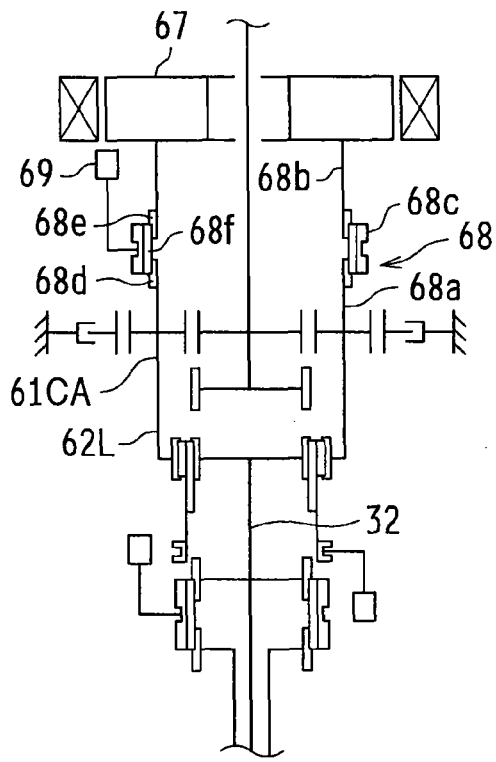

In this four-wheel-drive low-speed range mode, as illustrated in FIG. 4D, when the motor-coupling switch actuator 69 of the engage/disengage mechanism 68 moves the second sleeve 68c to the second slide position, the internal teeth 68f of the second sleeve 68c engage both the external teeth 68e of the motor side piece 68b and the external teeth 68d of the carrier side piece 68a, respectively. In this state, when the motor-generator 67 is driven to generate a motor torque, the motor torque is transmitted to the carrier 61CA to adjust a rotational speed of the carrier 61CA. Additionally, a rotational speed of the low-speed range piece 62L becomes adjustable. Also, four-wheel-drive running by motor assist and EV running by four-wheel driving are possible.

(Two-Wheel-Drive High-Speed Range Mode)

Next, a description will be given of a two-wheel-drive high-speed range mode.

FIG. 5A is a schematic configuration diagram of the transfer case 3 during steady running in the two-wheel-drive high-speed range mode.

As illustrated in FIG. 5A, in the two-wheel-drive high-speed range mode, the 2WD/4WD switching actuator 75 of the 2WD/4WD switching mechanism 7 arranges the third sleeve 74 in the second slide position where the internal teeth 74a of the third sleeve 74 engage the external teeth 73a of the four-wheel drive piece 73 without engaging the external teeth 71a of the output shaft side piece 71. Similarly to the case of the four-wheel-drive high-speed range mode, the range switch actuator 66 of the auxiliary transmission mechanism 6 arranges the first sleeve 63 in the first slide position while the motor-coupling switch actuator 69 of the engage/disengage mechanism 68 arranges the second sleeve 68c in the first slide position.

In this two-wheel-drive high-speed range mode, the third sleeve 74 in the second slide position allows two-wheel-drive running of the vehicle. The first sleeve 63 in the first slide position sets the high-speed range where deceleration is not performed in the auxiliary transmission mechanism 6. Additionally, in the case where the second sleeve 68c is arranged in the first slide position, power is not transmitted between the motor-generator 67 and the carrier 61CA of the planetary gear mechanism 61.

Figure 5B:
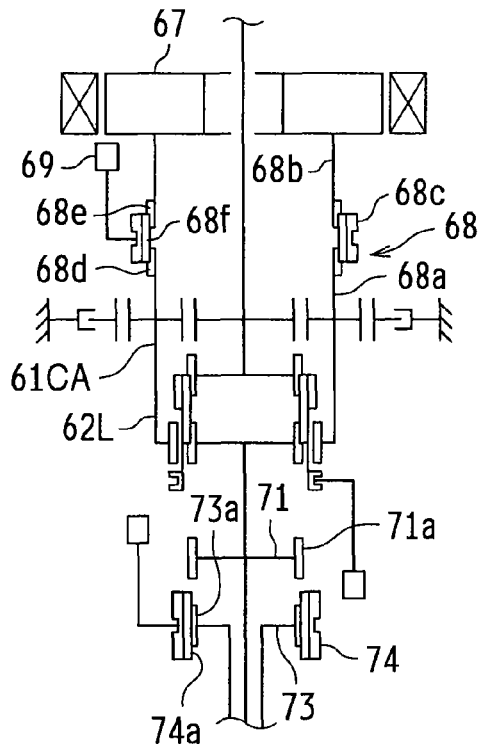

In this two-wheel-drive high-speed range mode, as illustrated in FIG. 5B, when the motor-coupling switch actuator 69 of the engage/disengage mechanism 68 moves the second sleeve 68c to the second slide position, the internal teeth 68f of the second sleeve 68c engage both the external teeth 68e of the motor side piece 68b and the external teeth 68d of the carrier side piece 68a, respectively. In this state, when the motor-generator 67 is driven to generate a motor torque, the motor torque is transmitted to the carrier 61CA to adjust a rotational speed of the carrier 61CA. Additionally, a rotational speed of the low-speed range piece 62L becomes adjustable. Also, motor-assisted two-wheel drive running and EV running by two-wheel drive are possible.

(Two-Wheel-Drive Low-Speed Range Mode)

Next, a description will be given of a two-wheel-drive low-speed range mode.

Figure 5C:
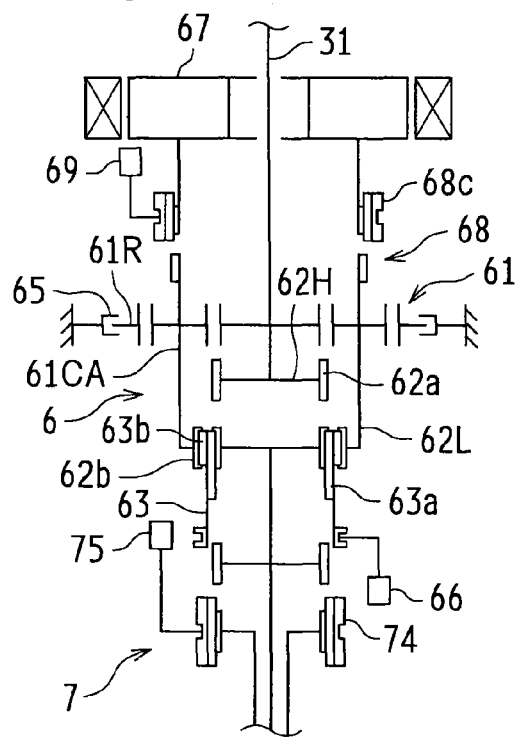

FIG. 5C is a schematic configuration diagram of the transfer case 3 during steady running in the two-wheel-drive low-speed range mode.

As illustrated in FIG. 5C, in the two-wheel-drive low-speed range mode, the range switch actuator 66 of the auxiliary transmission mechanism 6 arranges the first sleeve 63 in the second slide position. Then the external teeth 63b of the first sleeve 63 engage the internal teeth 62b of the low-speed range piece 62L while the internal teeth 63a of the first sleeve 63 do not engage the external teeth 62a of the high-speed range piece 62H. Similarly to the case of the two-wheel-drive high-speed range mode, the 2WD/4WD switching actuator 75 of the 2WD/4WD switching mechanism 7 arranges the third sleeve 74 in the second slide position. The motor-coupling switch actuator 69 of the engage/disengage mechanism 68 arranges the second sleeve 68c in the first slide position.

In this two-wheel-drive low-speed range mode, the third sleeve 74 in the second slide position allows two-wheel-drive running of the vehicle. The first sleeve 63 in the second slide position sets the low-speed range where deceleration is performed in the auxiliary transmission mechanism 6. Additionally, since the second sleeve 68c is arranged in the first slide position, power is not transmitted between the motor-generator 67 and the carrier 61CA of the planetary gear mechanism 61.

Figure 5D:
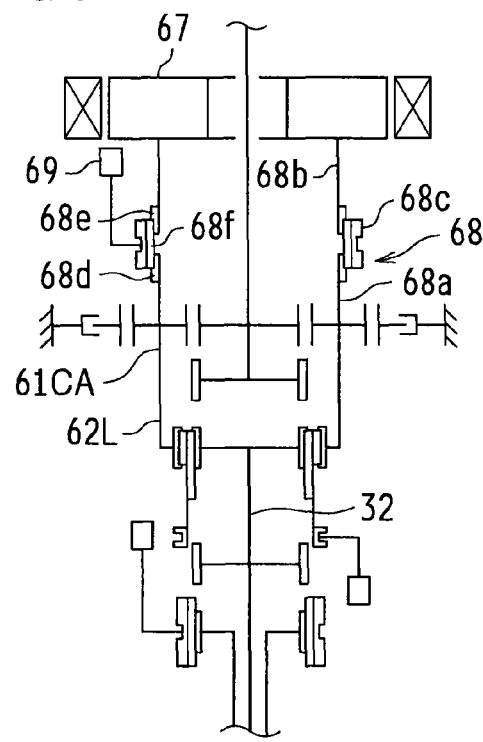

In this two-wheel-drive low-speed range mode, as illustrated in FIG. 5D, when the motor-coupling switch actuator 69 of the engage/disengage mechanism 68 moves the second sleeve 68c to the second slide position, the internal teeth 68f of the second sleeve 68c engage both the external teeth 68e of the motor side piece 68b and the external teeth 68d of the carrier side piece 68a, respectively. In this state, when the motor-generator 67 is driven to generate a motor torque, the motor torque is transmitted to the carrier 61CA to adjust a rotational speed of the carrier 61CA. Additionally, a rotational speed of the low-speed range piece 62L becomes adjustable. Also, motor-assisted two-wheel drive running and EV running by two-wheel drive are possible.

(Auxiliary Transmission Switching Operation)

Next, a description will be given of an auxiliary transmission switching operation in the auxiliary transmission mechanism 6. Here, respective descriptions will be given of a switching operation from the high-speed range mode to the low-speed range mode and a switching operation from the low-speed range mode to the high-speed range mode. These switching operations can be performed in any of a running state in four-wheel driving and a running state in two-wheel driving.

(Switching Operation from the High-Speed Range Mode to the Low-Speed Range Mode)

First, a description will be given of a switching operation from a steady running state in the high-speed range mode to a steady running state in the low-speed range mode. In the steady running state in the high-speed range mode, as illustrated in FIG. 4A or FIG. 5A, the brake 65 is engaged to stop the rotation of the ring gear 61R. The first sleeve 63 of the auxiliary transmission mechanism 6 is arranged in the first slide position. The second sleeve 68c of the engage/disengage mechanism 68 is arranged in the first slide position.

When a switching command (a switching command for the low-speed range mode in association with, for example, an operation of the range switch lever 97 by the driver) for the low-speed range mode during the steady running in the high-speed range mode is output from the ECU 100, a switching operation for the low-speed range mode is performed in the following procedure.

(L1) The motor-coupling switch actuator 69 of the engage/disengage mechanism 68 switches the second sleeve 68c from the first slide position to the second slide position (from the state illustrated in FIG. 4A to the state illustrated in FIG. 4B, or from the state illustrated in FIG. 5A to the state illustrated in FIG. 5B). That is, the state is switched to a state where power can be transmitted between the motor-generator 67 and the carrier 61CA.

(L2) The hydraulic control of the hydraulic control circuit 400 switches the brake 65 from the engaged state to the released state. That is, the state is switched to a state that allows rotation of the ring gear 61R. Thus, allowing the rotation of the ring gear 61R ensures a state where the motor-generator 67 can adjust the rotational speed of the carrier 61CA without limitation by the rotational speed of the sun gear 61S.

(L3) The torque control by the motor-generator 67 increases the rotational speed (the rotational speed of the low-speed range piece 62L) of the carrier 61CA to the rotational speed of the input shaft 31. That is, the rotational speed of the low-speed range piece 62L and the rotational speed of the first sleeve 63 are synchronized with each other (a synchronous operation for setting a rotational speed at an input shaft side close to a rotational speed at an output shaft side in the present invention). In this case, for example, the rotational speed (the rotational speed of the low-speed range piece 62L) of the motor-generator 67 is controlled to have approximately the same rotational speed as a rotational speed detected by the rotational speed sensor that can detect the rotational speed of the input shaft 31 or the rotational speed of the first sleeve 63.

(L4) The range switch actuator 66 of the auxiliary transmission mechanism 6 switches the first sleeve 63 from the first slide position to the second slide position (from the state illustrated in FIG. 4B to the state illustrated in FIG. 4D, or from the state illustrated in FIG. 5B to the state illustrated in FIG. 5D). That is, the external teeth 63b of the first sleeve 63 is engaged with the internal teeth 62b of the low-speed range piece 62L. In this state, the power input to the input shaft 31 is decelerated by the planetary gear mechanism 61, and is output to the output shaft 32.

(L5) The hydraulic control by the hydraulic control circuit 400 switches the brake 65 from the released state to the engaged state. That is, the state is returned to a state where the rotation of the ring gear 61R is forcibly stopped.

(L6) The motor-coupling switch actuator 69 of the engage/disengage mechanism 68 switches the second sleeve 68c from the second slide position to the first slide position (from the state illustrated in FIG. 4D to the state illustrated in FIG. 4C, or from the state illustrated in FIG. 5D to the state illustrated in FIG. 5C). That is, the state is returned to a state where the power is not transmitted between the motor-generator 67 and the carrier 61CA. The operations of (L5) and (L6) may be simultaneously performed. Alternatively, the operation of (L5) may be performed after the operation of (L6).

The above-described operations complete switching from the steady running state in the high-speed range mode to the steady running state in the low-speed range mode. In this case, when the first sleeve 63 is switched from the first slide position to the second slide position (the procedure (L4) described above), the rotational speed (the rotational speed of the low-speed range piece 62L) of the carrier 61CA is preliminarily increased to the rotational speed (the rotational speed of the output hub 64) of the output shaft 32. These rotational speeds are synchronized with each other. This significantly reduces a gear change shock during the range switching. Additionally, switching to the low-speed range mode is smoothly performed. This allows this range switch operation to be performed without getting the vehicle stuck.

(Switching Operation from the Low-Speed Range Mode to the High-Speed Range Mode)

Next, a description will be given of the switching operation from the steady running state in the low-speed range mode to the steady running state in the high-speed range mode. In the steady running state in the low-speed range mode, as illustrated in FIG. 4C or FIG. 5C, the brake 65 is engaged to stop the rotation of the ring gear 61R. The first sleeve 63 of the auxiliary transmission mechanism 6 is arranged in the second slide position while the second sleeve 68c of the engage/disengage mechanism 68 is arranged in the first slide position.

When a switching command (a switching command for the high-speed range mode in association with, for example, an operation of the range switch lever 97 by the driver) for the high-speed range mode during the steady running in the low-speed range mode is output from the ECU 100, a switching operation for the high-speed range mode is performed in the following procedure.

(H1) The motor-coupling switch actuator 69 of the engage/disengage mechanism 68 switches the second sleeve 68c from the first slide position to the second slide position (from the state illustrated in FIG. 4C to the state illustrated in FIG. 4D, or from the state illustrated in FIG. 5C to the state illustrated in FIG. 5D). That is, the state is switched to a state where the power can be transmitted between the motor-generator 67 and the carrier 61CA.

(H2) The hydraulic control of the hydraulic control circuit 400 switches the brake 65 from the engaged state to the released state. That is, the state is switched to a state that allows rotation of the ring gear 61R. Thus, allowing the rotation of the ring gear 61R ensures a state where the motor-generator 67 can adjust the rotational speed of the carrier 61CA without limitation by the rotational speed of the sun gear 61S.

(H3) The torque control of the motor-generator 67 increases the rotational speed (the rotational speed of the low-speed range piece 62L and the rotational speed of the output shaft 32) of the carrier 61CA to the rotational speed (the rotational speed of the high-speed range piece 62H) of the input shaft 31. That is, the rotational speed of the first sleeve 63 and the rotational speed of the high-speed range piece 62H are synchronized with each other (the synchronous operation for setting the rotational speed at the input shaft side close to the rotational speed at the output shaft side in the present invention). In this case, for example, the rotational speed (the rotational speed of the low-speed range piece 62L) of the motor-generator 67 is controlled to have approximately the same rotational speed as a rotational speed detected by the rotational speed sensor that can detect the rotational speed of the input shaft 31 or the rotational speed of the high-speed range piece 62H.

(H4) The range switch actuator 66 of the auxiliary transmission mechanism 6 switches the first sleeve 63 from the second slide position to the first slide position (from the state illustrated in FIG. 4D to the state illustrated in FIG. 4B, or from the state illustrated in FIG. 5D to the state illustrated in FIG. 5B). That is, the internal teeth 63a of the first sleeve 63 engage the external teeth 62a of the high-speed range piece 62H. Thus, the power input to the input shaft 31 is output to the output shaft 32 without being decelerated.

(H5) The hydraulic control by the hydraulic control circuit 400 switches the brake 65 from the released state to the engaged state. That is, the state is returned to a state where the rotation of the ring gear 61R is forcibly stopped.

(H6) The motor-coupling switch actuator 69 of the engage/disengage mechanism 68 switches the second sleeve 68c from the second slide position to the first slide position (from the state illustrated in FIG. 4B to the state illustrated in FIG. 4A, or from the state illustrated in FIG. 5B to the state illustrated in FIG. 5A). That is, the state is returned to a state where the power is not transmitted between the motor-generator 67 and the carrier 61CA. The operations of (H5) and (H6) may be simultaneously performed. Alternatively, the operation of (H5) may be performed after the operation of (H6).

The above-described operations complete switching from the steady running state in the low-speed range mode to the steady running state in the high-speed range mode. In this case, when the first sleeve 63 is switched from the second slide position to the first slide position (the procedure (H4) described above), the rotational speed (the rotational speed of the low-speed range piece 62L) of the carrier 61CA is preliminarily increased to the rotational speed (the rotational speed of the high-speed range piece 62H) of the input shaft 31. These rotational speeds are synchronized with each other. This significantly reduces a gear change shock during the range switching. When switching to the high-speed range mode is performed, the rotational speed of the output shaft 32 can also be increased in association with the increase in rotational speed of the carrier 61CA. This allows the range switch operation to be performed while inhibiting reduction in vehicle speed.

(Auxiliary Transmission Control)

Next, a description will be given of an auxiliary transmission control in the auxiliary transmission mechanism 6. This auxiliary transmission control selects a vehicle running mode corresponding to a vehicle running state or an operation (the operations of the switches 96 and 98 and the lever 97) by the driver.

Figure 6:
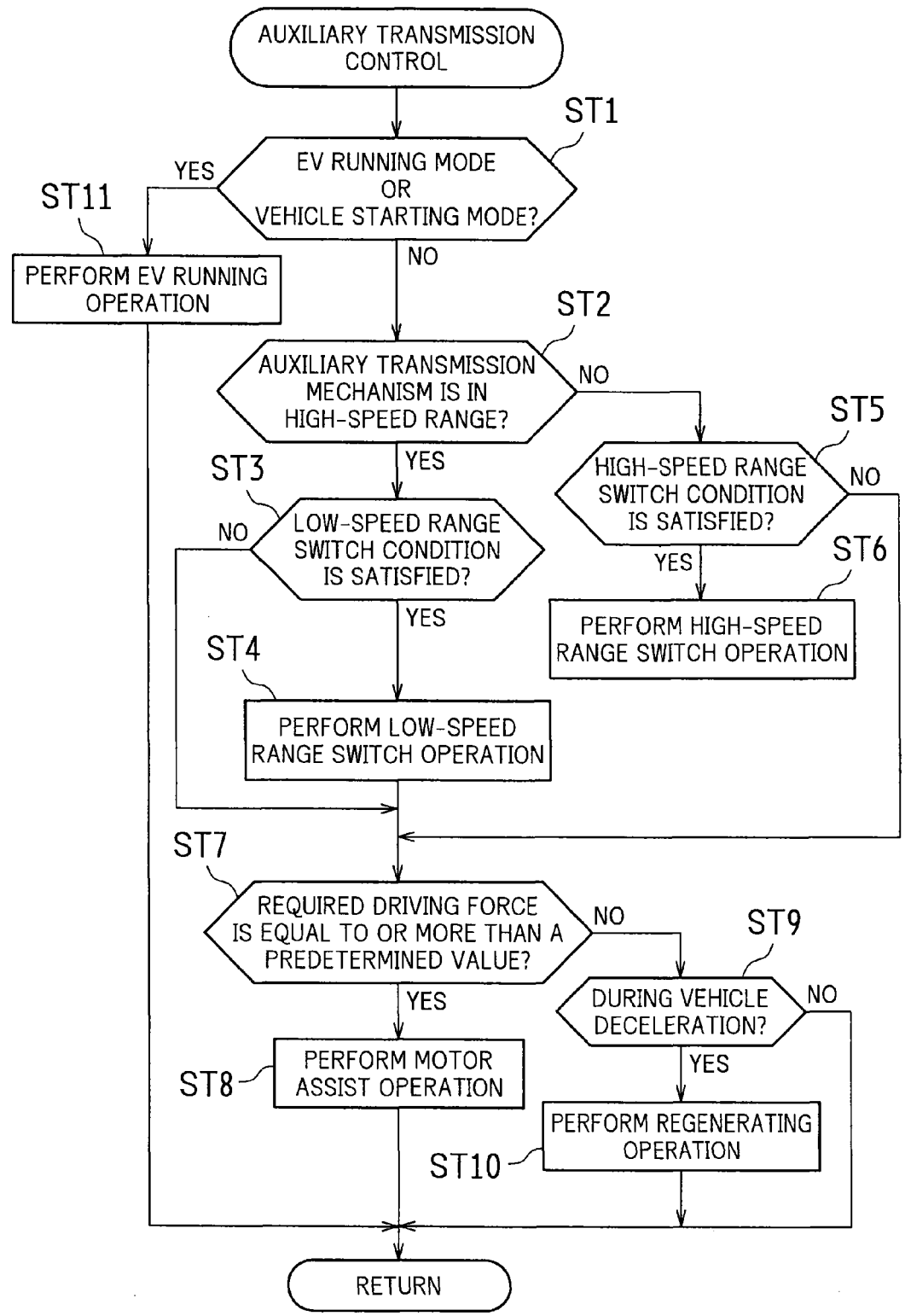
FIG. 6 is a flowchart illustrating a procedure of auxiliary transmission control.

FIG. 6 is a flowchart illustrating a procedure of the auxiliary transmission control. The procedure in this flowchart illustrated in FIG. 6 is performed every several msec after an ignition switch (or a start switch) is turned ON.

First, in step ST1, it is determined whether or not the current vehicle state is during an EV running mode or during a vehicle starting mode. An execution condition for the EV running mode is, for example, such that a push-in operation of the EV running selective switch 98 is completed and a remaining amount (a charged amount) of the electric power in the battery B, which is a state of charge (SOC), is equal to or more than a predetermined amount. It is determined whether or not the push-in operation of the EV running selective switch 98 is completed based on an output signal from the EV running selective switch 98. The SOC of the battery B is calculated based on an integrated value of charge/discharge currents detected by a current sensor (not shown). The current sensor is mounted on an electric power line coupled to an output terminal of the battery B. An execution condition for the vehicle starting mode is such that the vehicle is stopped, the shift lever position of the transmission 2 is in a running position (a position other than the P position and the N position), and the accelerator position is equal to or more than a predetermined amount. It is determined whether or not the vehicle is being stopped based on respective output signals from the wheel rotational speed sensors 99LF to 99RR. The shift lever position of the transmission 2 is determined based on an output signal from the shift position sensor 95. The accelerator position is detected by the accelerator position sensor 93.

In the case where the current vehicle state is not during the EV running mode or during the vehicle starting mode, NO is determined in step ST1. The process then proceeds to step ST2. In step ST2, it is determined whether or not the current range of the auxiliary transmission mechanism 6 is in the high-speed range. This determination is made, for example, based on a signal from a sensor for detecting a slide position of the first sleeve 63 or a signal from a sensor for detecting an operating position of the range switch lever 97.

In the case where the auxiliary transmission mechanism 6 is set to the high-speed range and YES is determined in step ST2, the process proceeds to step ST3. Subsequently, it is determined whether or not a low-speed range switch condition is satisfied. This low-speed range switch condition includes, for example, a case where the low-speed range is selected by an operation of the range switch lever 97 by the driver. Inclination of the road surface, irregularity of the road surface, differences among respective rotational speeds of the wheels 4L, 4R, 5L, and 5R, and similar parameter may be detected to determine whether or not the low-speed range switch condition is satisfied. In this case, satisfaction of any of the following conditions is determined as satisfaction of the low-speed range switch condition. The conditions include a case where the inclination of the road surface is equal to or more than a predetermined inclination, a case where the road surface has large irregularities and the road is determined to be a rough road, and a case where the differences among respective rotational speeds of the wheels 4L, 4R, 5L, and 5R are equal to or more than a predetermined amount (a case where deviations among the respective wheel speeds are equal to or more than a predetermined value due to running on a rough road, running on a low μ road, or similar running).

In the case where the low-speed range switch condition is not satisfied and NO is determined in step ST3, the process proceeds to step ST7 while the current range of the high-speed range is held.

Conversely, in the case where the low-speed range switch condition is satisfied and YES is determined in step ST3, the process proceeds to step ST4. Subsequently, the low-speed range switch operation is performed. That is, the operations of the above-described procedures (L1) to (L6) allow switching from the high-speed range mode to the low-speed range mode. That is, when the first sleeve 63 is switched from the first slide position to the second slide position, the motor-generator 67 increases the rotational speed (the rotational speed of the low-speed range piece 62L) of the carrier 61CA to the rotational speed of the input shaft 31. Subsequently, these rotational speeds are synchronized with each other. This performs a switching operation to the low-speed range mode with the reduced gear change shock.

Conversely, in the case where the auxiliary transmission mechanism 6 is currently set to the low-speed range and NO is determined in step ST2, the process proceeds to step ST5. Subsequently, it is determined whether or not a high-speed range switch condition is satisfied. This high-speed range switch condition includes, for example, a case where the high-speed range is selected by an operation of the range switch lever 97 by the driver. Inclination of the road surface, irregularity of the road surface, differences among respective rotational speeds of the wheels 4L, 4R, 5L, and 5R, and similar parameter may be detected to determine whether or not the high-speed range switch condition is satisfied. In this case, satisfaction of all of the following conditions is determined as satisfaction of the high-speed range switch condition. The conditions include a case where inclination of the road surface is less than a predetermined inclination, a case where the road surface has small irregularities and the road is determined to be a paved road, and a case where the differences among respective rotational speeds of the wheels 4L, 4R, 5L, and 5R are less than a predetermined amount.

In the case where the high-speed range switch condition is not satisfied and NO is determined in step ST5, the process proceeds to step ST7 while the current range of the low-speed range is held.

Conversely, in the case where the high-speed range switch condition is satisfied and YES is determined in step ST5, the process proceeds to step ST6. Subsequently, the high-speed range switch operation is performed. That is, the operations of the above-described procedures (H1) to (H6) allow switching from the low-speed range mode to the high-speed range mode. That is, when the first sleeve 63 is switched from the second slide position to the first slide position, the motor-generator 67 increases the rotational speed (the rotational speed of the low-speed range piece 62L and the rotational speed of the output shaft 32) of the carrier 61CA to the rotational speed of the input shaft 31 (the rotational speed of the high-speed range piece 62H). These rotational speeds are synchronized with each other. This performs a switching operation to the high-speed range mode while inhibiting gear change shock.

Thus, after the range of the auxiliary transmission mechanism 6 is held or switched, the process proceeds to step ST7. It is determined whether or not power required for driving the vehicle is equal to or more than a predetermined value. This determination is made based on the magnitude of the required driving power. This magnitude of the driving power is read out from a required driving power map (a map stored in the ROM of the ECU 100) that includes a vehicle speed and an accelerator position as parameters. For example, in the case where the vehicle speed is equal to or more than a predetermined value and the accelerator position is equal to or more than a predetermined degree of opening, the required driving power is determined to be equal to or more than a predetermined value.

The required driving power is equal to or more than the predetermined value and YES is determined in step ST7, the process proceeds to step ST8. Subsequently, motor assist operation is performed. That is, while the current range of the auxiliary transmission mechanism 6 is held, the motor-coupling switch actuator 69 of the engage/disengage mechanism 68 moves the second sleeve 68c to the second slide position. The internal teeth 68f of the second sleeve 68c are engaged with both the external teeth 68e of the motor side piece 68b and the external teeth 68d of the carrier side piece 68a, respectively. Subsequently, the motor-generator 67 is driven to generate a motor torque. The motor torque is transmitted to the carrier 61CA to start running by motor assistance.

In this motor-assisted operation, basically, the brake 65 is engaged to forcibly stop the rotation of the ring gear 61R. In the case where the hydraulic control in the hydraulic control circuit 400 turns the brake 65 into a semi-engagement state to adjust the engaging force, an assist amount by the motor-generator 67 can be adjusted.

Conversely, in the case where the required driving power is less than the predetermined value and NO is determined in step ST7, the process proceeds to step ST9. Subsequently, it is determined whether or not the vehicle is being decelerated. In this determination, while the vehicle is running, in the case where the accelerator position detected by the accelerator position sensor 93 becomes less than a predetermined degree of opening, or in the case where a depressing operation of the brake pedal is detected by the brake pedal sensor 94, it is determined that the vehicle is being decelerated.

In the case where YES is determined in step ST9 while the vehicle decelerates, the process proceeds to step ST10 and a regenerative operation is performed. That is, while the current range of the auxiliary transmission mechanism 6 is held, the motor-coupling switch actuator 69 of the engage/disengage mechanism 68 moves the second sleeve 68*c* to the second slide position. The internal teeth 68*f* of the second sleeve 68*c* are engaged with both the external teeth 68*e* of the motor side piece 68*b* and the external teeth 68*d* of the carrier side piece 68*a*, respectively. Subsequently, turning the motor-generator 67 into the driven state allows the motor-generator 67 to generate electricity, and this generated electric power charges the battery B through the inverter 200.

In this regenerative operation, basically, the brake 65 is engaged to forcibly stop the rotation of the ring gear 61R. In the case where the hydraulic control in the hydraulic control circuit 400 turns the brake 65 into a semi-engagement state to adjust the engaging force, a rotational speed of the motor-generator 67 in the driven state can be adjusted. This allows adjustment of an amount that is regenerated.

Additionally, in the case where the vehicle is not being decelerated, NO is determined in step ST9. The process returns while the current range of the auxiliary transmission mechanism 6 is held.

Conversely, in the case where the current vehicle state is determined to be in the EV running mode or the vehicle starting mode, YES is determined in step ST1. Then the process proceeds to step ST11. In this step ST11, while the current range of the auxiliary transmission mechanism 6 is held, the motor-coupling switch actuator 69 of the engage/disengage mechanism 68 moves the second sleeve 68*c* to the second slide position. The internal teeth 68*f* of the second sleeve 68*c* are engaged with both the external teeth 68*e* of the motor side piece 68*b* and the external teeth 68*d* of the carrier side piece 68*a*, respectively. Subsequently, the motor-generator 67 is driven to generate a motor torque. The motor torque is transmitted to the carrier 61CA to perform EV running or start the vehicle using the torque from the motor-generator 67. That is, in the high-speed range, the motor torque is transmitted to the motor side piece 68*b*, the second sleeve 68*c*, the carrier side piece 68*a*, the carrier 61CA, the sun gear 61S, the high-speed range piece 62H, the first sleeve 63, the output hub 64, and the output shaft 32 in this order to perform EV running or start the vehicle. Conversely, in the low-speed range, the motor torque is transmitted to the motor side piece 68*b*, the second sleeve 68*c*, the carrier side piece 68*a*, the carrier 61CA, the low-speed range piece 62L, the first sleeve 63, the output hub 64, and the output shaft 32 in this order to perform EV running or start the vehicle. The above-described operations are repeatedly performed.

In the EV running and vehicle starting, the brake 65 is released and the transmission 2 is set to a P (parking) range. This efficiently transmits the motor torque from the motor-generator 67 to the output shaft 32 without rotation of the input shaft 31.

As described above, in this embodiment, when the range of the auxiliary transmission mechanism 6 is switched, the power from the motor-generator 67 rotates the carrier 61CA. The meshing change operation is performed by a sliding movement of the first sleeve 63 in a state where the rotational speed at the input shaft 31 side and the rotational speed at the output shaft 32 side are set close to each other. This reduces the gear change shock associated with the range switch even in the vehicle running state. Additionally, a special synchronization mechanism is not necessary to reduce the gear change shock, which results in a configuration that is not complicated.

In this embodiment, since the motor-generator 67 is coupled to the carrier 61CA, the rotational speed of the motor-generator 67 coincides with the rotational speed of the carrier 61CA. This ensures responsiveness of change in rotational speed of the carrier 61CA and quickly increases the rotational speed of the carrier 61CA to a target rotational speed (a synchronous rotational speed) which is satisfactory.

In this embodiment, the operations (L6) and (H6) each switch the second sleeve 68*c* from the second slide position to the first slide position to return the state to a state where the power is not transmitted between the motor-generator 67 and the carrier 61CA. Accordingly, when the vehicle runs only by the power from the engine 1, the power from the engine 1 is not transmitted to the motor-generator 67. This prevents drag from turning the motor-generator 67. This improves energy efficiency.

Additionally, in this embodiment, the operations (L5) and (H5) each switch the brake 65 from the released state to the engaged state to forcibly stop the rotation of the ring gear 61R. Accordingly, the power from the engine 1 prevents the ring gear 61R from rotating. This effectively transmits the power from the engine 1 to the output shaft 32, thus improving energy efficiency.

(Modification)

Next, a description will be given of a modification. This modification is different in configuration from the engage/disengage mechanism 68 in the above-described embodiment. Other configurations and operations are similar to those of the above-described embodiment. Here, only the configuration of the engage/disengage mechanism 68 will be described.

Figure 7:
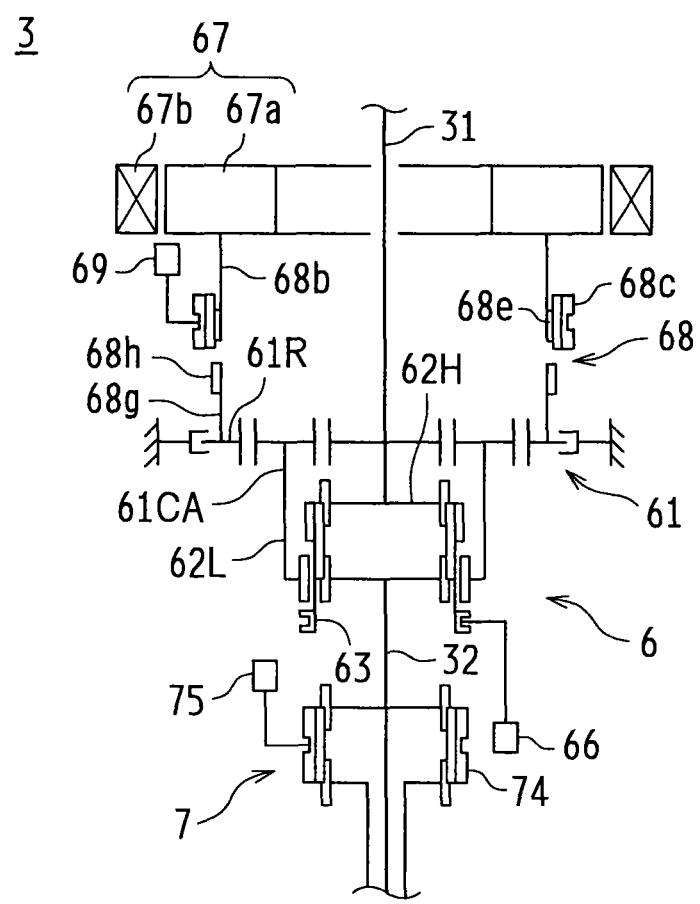
FIG. 7 is a schematic configuration diagram of a transfer case according to a modification.

FIG. 7 is a schematic configuration diagram of the transfer case 3 mounted on a four-wheel drive vehicle according to this modification. As illustrated in FIG. 7, the engage/disengage mechanism 68 of the transfer case 3 in this modification is coupled to the ring gear 61R of the planetary gear mechanism 61. That is, the engage/disengage mechanism 68 in this modification includes a ring gear side piece 68*g*, the motor side piece 68*b*, and the second sleeve 68*c*. The ring gear side piece 68*g* is rotatably integrated with the ring gear 61R. The motor side piece 68*b* is rotatably integrated with the rotor 67*a* of the motor-generator 67. The second sleeve 68*c* is movable along the shaft center of the input shaft 31.

Configurations and operations of the ring gear side piece 68*g*, the motor side piece 68*b*, and the second sleeve 68*c* are similar to those of the carrier side piece 68*a*, the motor side piece 68*b*, and the second sleeve 68*c* in the above-described embodiment, these will not be further elaborated here. In FIG. 7, like reference numerals designate corresponding or identical elements to those of the transfer case 3 in the above-described embodiment.

In this modification, during the range switching of the auxiliary transmission mechanism 6, the rotational speed of the carrier 61CA is adjusted by adjustment of the rotational speed of the ring gear 61R.

The configuration of this modification decreases an amount of change in rotational speed of the carrier 61CA relative to an amount of change in rotational speed of the ring gear 61R. This allows adjustment of the rotational speed of the carrier 61CA with high accuracy, thus improving reliability of the synchronous operation.

Other Embodiments

While in the above-described embodiment and modification, the description has been given of the case where the present invention is applied to an FR-based four-wheel drive vehicle, the present invention is not limited to this. The present invention may be applied to an FF (front-engine front-wheel drive)-based four-wheel drive vehicle.

While in the above-described embodiment and modification, the description has been given of the case where the present invention is applied to a four-wheel drive vehicle where the two-wheel drive state and the four-wheel drive state are switchable, the present invention is not limited to this. The present invention may be applied to a vehicle (a full-time 4WD vehicle) that always runs in the four-wheel drive state or a two-wheel-drive vehicle (a vehicle that does not include the 2WD/4WD switching mechanism 7 and the power split mechanism 8 but includes the auxiliary transmission mechanism 6).

While in the above-described embodiment and modification, the electric machine includes the motor-generator 67 and generates electricity when the vehicle is decelerated, a configuration that employs an electric motor that does not generate electricity is also within the technical scope of the present invention.

While in the above-described embodiment and modification, the 2WD/4WD switching mechanism 7 and the engage/disengage mechanism 68 are mesh engagement mechanisms where the sleeves 74 and 68c move slidably. An electric control coupling mechanism may be employed.

Furthermore, in the respective mode switching operations (the operations (L1) to (L6) and the operations (H1) to (H6)), subsequent operations may be performed after completion of the respective mode switching operations based on detection signals of the sensors and similar member. For example, it is configured such that the slide position of the second sleeve 68c is detectable by the sensor. In the operation (L1), a transition to the operation (L2) is performed after the second sleeve 68c is confirmed to be switched to the second slide position. Additionally, for example, it is configured such that switching of the brake 65 to the released state is detectable by a detection of the hydraulic pressure. In the operation (L2), a transition to the operation (L3) is performed after the brake 65 is confirmed to be switched to the released state.

Additionally, while in the above-described embodiment and modification the respective sleeves 63, 68c, 74, and 303 are disposed at separate actuators 66, 69, 75, and 304, the present invention is not limited to this. The present invention may have a configuration where one actuator moves a plurality of sleeves.

INDUSTRIAL APPLICABILITY

The present invention is applicable to an auxiliary transmission mechanism that can switch between a high-speed range and a low-speed range in a vehicle running state.

DESCRIPTION OF REFERENCE SIGNS

1 engine (power source)
31 input shaft
32 output shaft
61 planetary gear mechanism
61S sun gear (rotational element)
61R ring gear (rotational element)
61CA carrier (rotational element)
62H high-speed range piece
62L low-speed range piece
63 first sleeve
65 brake (brake unit)
67 motor-generator (electric machine)
67a rotor
68 engage/disengage mechanism
100 ECU

The invention claimed is:

1. A vehicle power transmission apparatus comprising:
    a planetary gear mechanism on a power transmission path, a power from a power source being transmitted to the power transmission path, the planetary gear mechanism including rotational elements, the rotational elements including a rotational element configured to transmit a power to an output shaft, wherein a meshing change operation of a meshing mechanism switches the rotational element configured to transmit the power to the output shaft so as to change a gear ratio on the power transmission path; and
    an electric machine configured to transmit a power to a planetary carrier of the planetary gear mechanism, the planetary carrier being one of the rotational elements, wherein
    when the meshing change operation of the meshing mechanism switches the rotational element configured to transmit the power to the output shaft, the apparatus performs a synchronous operation where the power from the electric machine rotates the planetary carrier to set a rotational speed at an input shaft side close to a rotational speed at an output shaft side.

2. The vehicle power transmission apparatus according to claim 1, wherein
    the change of the gear ratio switches a gear ratio between a low-speed range at a large gear ratio side and a high-speed range at a small gear ratio side, the planetary carrier being coupled to transmit the power to the output shaft in the low-speed range, and
    when switching from the high-speed range to the low-speed range, the power from the electric machine increases the rotational speed of the planetary carrier to be set close to the rotational speed at the input shaft side.

3. The vehicle power transmission apparatus according to claim 1, wherein
    the change of the gear ratio switches a gear ratio between a low-speed range at a large gear ratio side and a high-speed range at a small gear ratio side, the planetary carrier being coupled to transmit the power to the output shaft in the low-speed range, and
    when switching from the low-speed range to the high-speed range, the power from the electric machine increases the rotational speed of the planetary carrier to set the rotational speed at the output shaft side close to the rotational speed at the input shaft side.

4. The vehicle power transmission apparatus according to claim 1, wherein
    the planetary carrier is coupled to a rotating shaft of the electric machine.

5. The vehicle power transmission apparatus according to claim 1, wherein
the planetary gear mechanism includes a ring gear coupled to a rotating shaft of the electric machine, the ring gear being one of the rotational elements.

6. The vehicle power transmission apparatus according to claim 1, further comprising
an engage/disengage mechanism configured to switch power transmission and non-power transmission between the planetary carrier and the electric machine, wherein
when the meshing change operation of the meshing mechanism switches the rotational element configured to transmit the power to the output shaft, the vehicle power transmission apparatus sets the engage/disengage mechanism to a power transmission state, and rotates the planetary carrier by the power from the electric machine, the vehicle power transmission apparatus being configured to set the engage/disengage mechanism to a non-power transmission state after the switching operation of the rotational element configured to transmit the power to the output shaft.

7. The vehicle power transmission apparatus according to claim 1, further comprising
a brake unit configured to stop rotation of a ring gear of the planetary gear mechanism, the ring gear being one of the rotational elements, wherein
when the meshing change operation of the meshing mechanism switches the rotational element configured to transmit the power to the output shaft, the vehicle power transmission apparatus releases the brake unit to allow the ring gear to rotate, the vehicle power transmission apparatus being configured to engage the brake unit to stop the rotation of the ring gear after the switching operation.

8. The vehicle power transmission apparatus according to claim 1, wherein
when a required driving power for a vehicle is equal to or more than a predetermined value, the power from the electric machine rotates the planetary carrier to transmit the power from the electric machine to the output shaft.

9. The vehicle power transmission apparatus according to claim 1, wherein
in a state where the power source is stopped, the power from the electric machine rotates the planetary carrier to transmit the power from the electric machine to the output shaft.

10. The vehicle power transmission apparatus according to claim 1, wherein
when a vehicle is decelerated during running, a rotational force of a wheel is transmitted to the electric machine through the power transmission path to set the electric machine to be in a driven state so as to generate electricity by the electric machine.

* * * * *